United States Patent
Kim et al.

(10) Patent No.: US 8,684,547 B2
(45) Date of Patent: Apr. 1, 2014

(54) BACKLIGHT UNIT AND DISPLAY APPARATUS USING THE SAME

(75) Inventors: Min Sang Kim, Seoul (KR); Ji Won Jang, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 276 days.

(21) Appl. No.: 13/109,102

(22) Filed: May 17, 2011

(65) Prior Publication Data

US 2011/0286202 A1 Nov. 24, 2011

(30) Foreign Application Priority Data

Aug. 18, 2010 (KR) .................. 10-2010-0079673
Sep. 24, 2010 (KR) .................. 10-2010-0092846

(51) Int. Cl.
*F21V 7/04* (2006.01)
*H01J 19/54* (2006.01)

(52) U.S. Cl.
USPC .................. 362/97.1; 313/113; 362/609

(58) Field of Classification Search
USPC .................. 362/97.1, 609, 623; 313/113
See application file for complete search history.

(56) References Cited

U.S. PATENT DOCUMENTS

| | | | |
|---|---|---|---|
| 5,530,628 A | 6/1996 | Ngai | |
| 6,375,335 B1 * | 4/2002 | Tabata et al. | 362/612 |
| 2007/0247869 A1 * | 10/2007 | Lang et al. | 362/612 |
| 2008/0062714 A1 * | 3/2008 | Kim et al. | 362/609 |
| 2010/0237358 A1 | 9/2010 | Nishida | |

FOREIGN PATENT DOCUMENTS

| | | |
|---|---|---|
| EP | 1106916 | 6/2001 |
| EP | 2116762 | 11/2009 |
| JP | 08-171806 | 7/1996 |
| JP | 2001-201729 | 7/2001 |
| JP | 2001-307526 | 11/2001 |
| JP | 2003-330393 | 11/2003 |
| JP | 2005-327682 | 11/2005 |
| JP | 2006-078778 | 3/2006 |
| JP | 2007-172872 | 7/2007 |
| JP | 2007-287463 | 11/2007 |
| JP | 2008-270786 | 11/2008 |
| JP | 2009-070869 | 4/2009 |
| JP | 2010-067372 | 3/2010 |
| KR | 1020000010775 | 2/2000 |
| KR | 1020030056529 | 7/2003 |
| KR | 1020060036039 | 4/2006 |
| KR | 20-0435252 | 1/2007 |
| KR | 1020070076496 | 7/2007 |
| KR | 1020090016100 | 2/2009 |

OTHER PUBLICATIONS

Korean Office Action for 10-2010-0079673 dated May 4, 2012.
Korean Office Action for 10-2010-0092846 dated Jan. 4, 2012.
Korean Office Action for 10-2010-0079673 dated Jan. 4, 2012.
European Search Report for 11169426 dated Dec. 6, 2011.

* cited by examiner

*Primary Examiner* — Joseph L Williams
(74) *Attorney, Agent, or Firm* — Lowe Hauptman & Ham, LLP

(57) ABSTRACT

A backlight unit and a display apparatus using the same are disclosed. The backlight unit includes an optical sheet, a reflector having a reflective surface spaced apart from the optical sheet and having an inclined surface, a fixture connected to one side of the reflector, and a light source disposed to one side of the reflector.

19 Claims, 43 Drawing Sheets

BACKLIGHT UNIT AND DISPLAY APPARATUS USING THE SAME

This application claims the benefit of Korean Patent Application No. P2010-0079673, filed on, Aug. 18, 2010, and Patent Application No. P2010-0092846, filed on Sep. 24, 2010, which are hereby incorporated by reference as if fully set forth herein.

BACKGROUND OF THE INVENTION

1. Field of the Invention

Embodiments relate to a backlight unit and a display apparatus using the same.

2. Discussion of the Related Art

Generally, representative large-scale display apparatuses include Liquid Crystal Displays (LCDs), Plasma display Panels (PDPs), etc.

Unlike self-emission type PDPs, LCDs essentially need a separate backlight unit due to absence of self light emitting devices.

Backlight units for use in LCDs are classified into edge type backlight units and vertical type backlight units according to positions of light sources. In an edge type backlight unit, light sources are arranged at left and right edges or upper and lower edges of an LCD panel and a light guide plate is provided to uniformly distribute light throughout a surface of the LCD panel, which ensures uniform luminance and enables production of an extremely thin display panel.

A vertical type backlight unit is generally applied to displays of 20 inches or more. The vertical type backlight unit advantageously has greater light efficiency than the edge type backlight unit owing to a plurality of light sources being arranged below a panel and thus, is mainly used in a large-scale display requiring high luminance.

Conventional edge type or vertical type backlight units adopt Cold Cathode Fluorescent Lamps (CCFL) as a light source.

The backlight units using CCFLs, however, have several disadvantages, such as consumption of a great quantity of power because power should always be applied to a CCFL, low color reproduction efficiency of about 70% that of a Cathode Ray Tube (CRT), and environmental pollution due to use of mercury.

Currently, backlight units using Light Emitting Diodes (LEDs) are being studied as a solution to the above described problems.

In the case of backlight units using LEDs, turning on or off a part of an LED array is possible, which can achieve remarkable reduction in power consumption. In particular, RGB LEDs exhibit color reproduction beyond 100% of a color reproduction range proposed by the National Television System Committee (NTSC) and can provide more vivid images to consumers.

Further, LEDs fabricated through semiconductor processes are environmentally friendly.

Although LCD products using LEDs having the above described advantages have been introduced, these LCD products need expensive drivers, PCBs, etc. because LEDs have a driving mechanism different from conventional CCFLs.

For this reason, LED backlight units are applied only to high-price LCD products at present.

SUMMARY OF THE INVENTION

An object of the present invention is to provide a backlight unit, which includes an air guide to realize a light-weight design suited to mass-production using a reflector having an inclined surface, and a display apparatus using the backlight unit.

To achieve these objects and other advantages and in accordance with the purpose of the invention, as embodied and broadly described herein, a backlight unit includes an optical member, a reflector spaced apart from the optical member and partially having an inclined surface, a fixture connected to one side of the reflector so as to fix the reflector, and a light source disposed to one side of the reflector.

An air guide may be formed in a space between the optical member and the reflector.

A lower surface of the reflector and an upper surface of the fixture may be arranged to face each other, and a distance between the lower surface of the reflector and the upper surface of the fixture may gradually increase with increasing distance from a connection location of the reflector and the fixture.

At least one of an elastic member and a spacer may be disposed between the lower surface of the reflector and the upper surface of the fixture.

A thickness of the reflector may increase with increasing distance from the light source.

The inclined surface of the reflector may have an inclination angle of 0 to 85 degrees with respect to an optical axis of light transmitted from the light source.

The light source may be disposed to come into contact with at least one side of the reflector, or may be spaced apart from the reflector by a predetermined distance.

In accordance with another aspect of the present invention, a backlight unit includes an optical member, a reflector spaced apart from the optical member and partially having an inclined surface, a bracket disposed between the optical member and the reflector and having a recess formed therein, and a light source disposed in the recess of the bracket.

The recess of the bracket may be oriented toward the reflector, and a reflective layer may be provided at a surface of the recess of the bracket.

A light diffusion layer may fill the recess of the bracket.

In accordance with a further aspect of the present invention, a backlight unit includes an optical member, a reflector spaced apart from the optical member and partially having an inclined surface, a bracket disposed between the optical member and the reflector, a light source fixed to the bracket, and a light diffusion layer spaced apart from a front surface of the light source by a predetermined distance.

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Reference will now be made in detail to the preferred embodiments of the present invention, examples of which are illustrated in the accompanying drawings.

Prior to description of the embodiments, it will be understood that, when each element is referred to as being formed "on" or "under" the other element, it can be directly "on" or "under" the other element or be indirectly formed with intervening one or more other elements therebetween.

The terms "on" or "under" may indicate either a downward direction or an upward direction when reinforcing a single element.

Figure 1:
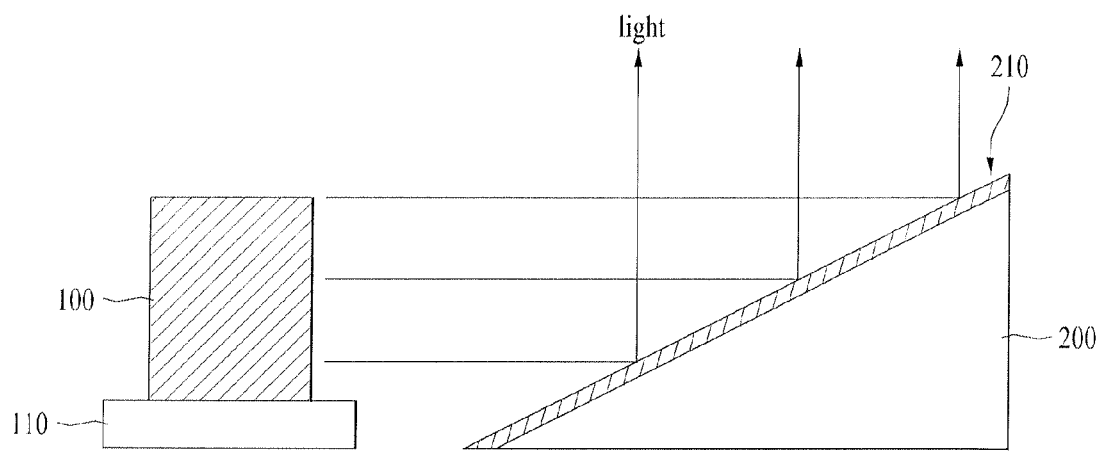
FIG. 1 is a view explaining a basic concept of a backlight unit according to an embodiment.

FIG. 1 is a view explaining a basic concept of a backlight unit according to an embodiment. As illustrated in FIG. 1, the backlight unit may include a light source 100 and a reflector 200. The backlight unit includes an air guide (not shown) to realize a light-weight design suited to mass-production using a reflector 200 having an inclined reflective surface 210, and a display apparatus using the backlight unit. The air guide (not shown) may be formed in a space between the optical sheet (not shown) and the reflector 200.

The light source 100 may be disposed on at least one side of the reflector 200.

Also, at least one light source 100 may be formed on a support layer 110.

The support layer 110 may be a substrate on which the at least one light source 100 is mounted. An electrode pattern (not shown) to connect a power supply adaptor (not shown) and the light source 100 to each other may be formed on the support layer 110.

For example, a carbon nanotube electrode pattern (not shown) may be formed on an upper surface of the substrate so as to connect the light source 100 and the adaptor (not shown) to each other.

The support layer 110 may be a Printed Circuit Board (PCB) substrate made of polyethylene terephthalate (PET), glass, polycarbonate (PC), silicon (Si), or the like, on which a plurality of light sources 100 is mounted, or may take the form of a film.

The light source 100 may be a Light Emitting Diode (LED) chip. The LED chip may be a blue LED chip or ultraviolet LED chip, or may be a package combining at least one selected from the group consisting of a red LED chip, green LED chip, blue LED chip, yellow green LED chip and white LED chip.

A white LED may be realized by coupling a yellow phosphor to a blue LED, coupling both red and green phosphors to a blue LED, or coupling yellow, red and green phosphors to a blue LED.

Here, the light source 100 may be any one of a horizontal light source, vertical light source and hybrid light source.

Figure 2A:
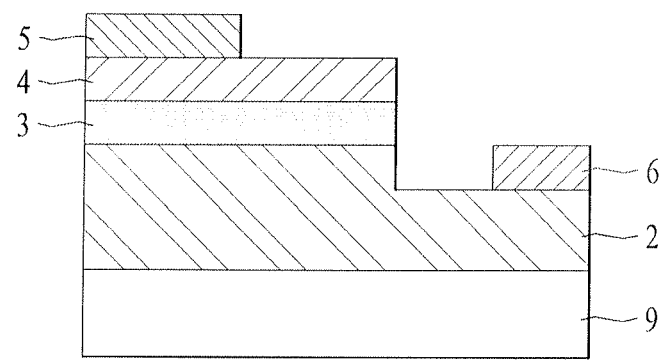
FIGS. 2A to 2C are views illustrating various configurations of light sources.
Figure 2B:
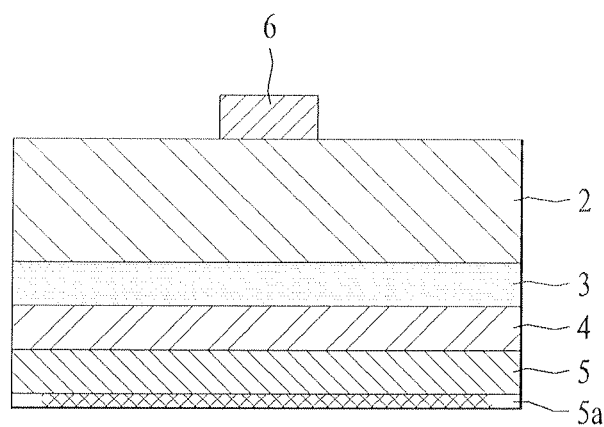
Figure 2C:
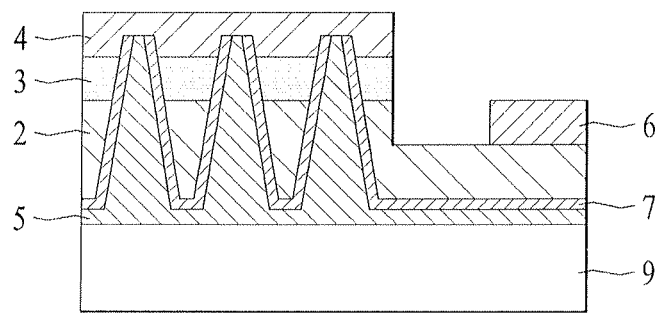

FIG. 2A is a view illustrating a horizontal light source, FIG. 2B is a view illustrating a vertical light source, and FIG. 2C is a view illustrating a hybrid light source.

As illustrated in FIG. 2A, a substrate 9 made of silicon or sapphire constitutes a lowermost layer of the horizontal light source.

An n-type semiconductor layer 2 may be located on the substrate 9. The n-type semiconductor layer 2 is, for example, made of n-GaN.

An active layer 3 may be located on the n-type semiconductor layer 2. The active layer 3 is, for example, formed by repeatedly stacking InGaN (well layer) and GaN (barrier layer) one above another.

A p-type semiconductor layer 4 may be located on the active layer 3. The p-type semiconductor layer 4 is, for example, made of p-GaN.

A p-type electrode 5 may be located on the p-type semiconductor layer 4. The p-type electrode 5, for example, contains at least one selected from the group consisting of Cr, Ni and Au.

An n-type electrode 6 may be located on the n-type semiconductor layer 2. The n-type electrode 6, for example, contains at least one selected from the group consisting of Cr, Ni and Au.

As illustrated in FIG. 2B, the vertical light source may include a p-type electrode 5 having a reflective surface 5a, p-type semiconductor layer 4, active layer 3, n-type semiconductor layer 2 and n-type electrode 6, which are sequentially stacked one above another.

The light source may be operated according to a principle that holes and electrons are combined with each other in the active layer 3 if voltage is applied to the p-type electrode 5 and the n-type electrode 6, thereby emitting light energy corresponding to a difference (energy gap) between a conduction band and a valence band.

As illustrated in FIG. 2C, the hybrid light source includes an n-type semiconductor layer 2, active layer 3 and p-type semiconductor layer 4 formed on a substrate 9.

An n-type electrode 6 is formed on the n-type semiconductor layer 2. A p-type electrode 5 is formed between the substrate 9 and the n-type semiconductor layer 2 to come into contact with the p-type semiconductor layer 4 through the n-type semiconductor layer 2 and the active layer 3.

That is, the p-type electrode 5 comes into contact with the p-type semiconductor layer 4 through holes perforated in the n-type semiconductor layer 2 and the active layer 3.

An insulating film 7 is coated around the hole to electrically insulate the p-type electrode 5.

In an embodiment, the light source having the above described configuration may include any one substrate comprising at least one selected from the group consisting of $Al_2O_3$ substrate, semiconductor substrate, and conductive substrate having a light extraction structure, a buffer layer may be formed on the substrate and comprise single or superlattices (SLSs) having at least one selected from the group consisting of GaN, AlN, AlGaN, and InGaN, and a first N-type semiconductor layer may be formed on the buffer layer comprising single or superlattices (SLSs) having at least one selected from the group consisting of GaN, AlGaN, InGaN, InAlGaN, and AlInN.

Here, the first N-type semiconductor layer may be made of a semiconductor material having a formula of $In_xAl_yGa_{1-(x+y)}N$ ($0 \leq x \leq 1, 0 \leq y \leq 1, 0 \leq x+y \leq 1$), and an n-type dopant, such as Si, Ge, Sn, etc., may be doped.

Also, a second N-type semiconductor layer may be formed on the first N-type semiconductor layer comprising SLSs (about 3~10 layers) having at least one selected from the group consisting of InGaN/GaN, AlGaN/GaN, InGaN/InGaN, and AlGaN/InGaN, and an active layer may be formed on the second N-type semiconductor layer comprising at least one selected from the group consisting of InGaN/GaN or InGaN/InGaN well/barrier layers, etc.

Here, the active layer may have any one structure among single quantum well, multi quantum well, quantum dot and quantum wire structures.

A first P-type semiconductor layer may be formed on the active layer using any one material selected from among $AlGaN_T$, AlGaN/GaN SLSs (about 30 nm or less), etc., and a second P-type semiconductor layer may be formed on the first P-type semiconductor layer using any one material selected from among $GaN_T$ or AlGaN/GaN SLSs, etc.

Here, a semiconductor material having a formula of $In_xAl_yGa_{1-(x+y)}N$ ($0 \leq x \leq 1, 0 \leq y \leq 1, 0 \leq x+y \leq 1$) may be used, and a p-type dopant, such as Mg, Zn, Ca, Sr, Ba, etc., may be doped.

A first n-electrode, a second p-electrode pad, and a second ohmic contact layer or transparent layer may be formed in a single layer or in multiple layers comprising at least one selected from the group consisting of Indium Tin Oxide (ITO), Indium Zinc Oxide (IZO), Indium Zinc Tin Oxide (IZTO), Indium Aluminum Zinc Oxide (IAZO), Indium Gallium Zinc Oxide (IGZO), Indium Gallium Tin Oxide (IGTO), Aluminum Zinc Oxide (AZO), Antimony Tin Oxide (ATO), Gallium Zinc Oxide (GZO), IrOx, RuOx, RuOx/ITO, Ni, Ag, Ni/IrOx/Au, and Ni/IrOx/Au/ITO.

As such, the light source 100 of the present embodiment may be selected from various shapes of light emitting devices.

The reflector 200 may include a reflective surface 210 having a predetermined gradient.

The reflective surface 210 of the reflector 200 is an inclined surface having a predetermined inclination angle with respect to an imaginary horizontal plane parallel to a surface of an optical sheet (not shown) disposed above the reflective surface 210. The reflective surface 210 is a flat surface to reflect light projected from the light source 100 toward a display panel thereabove.

The reflective surface 210 of the reflector 200 may have an inclination angle of about 0~85 degrees with respect to an optical axis of the light projected from the light source 100.

Figure 3A:
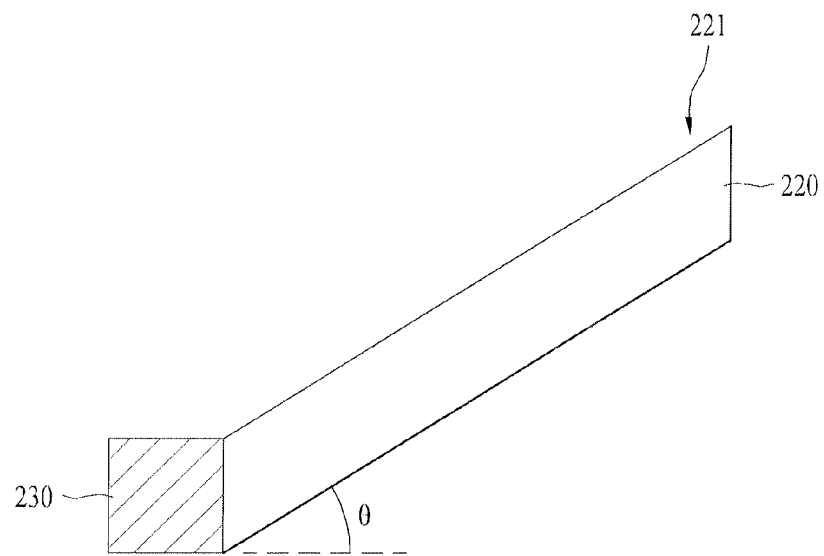
FIGS. 3A and 3B are views illustrating an embodiment of a reflector of FIG. 1.
Figure 3B:
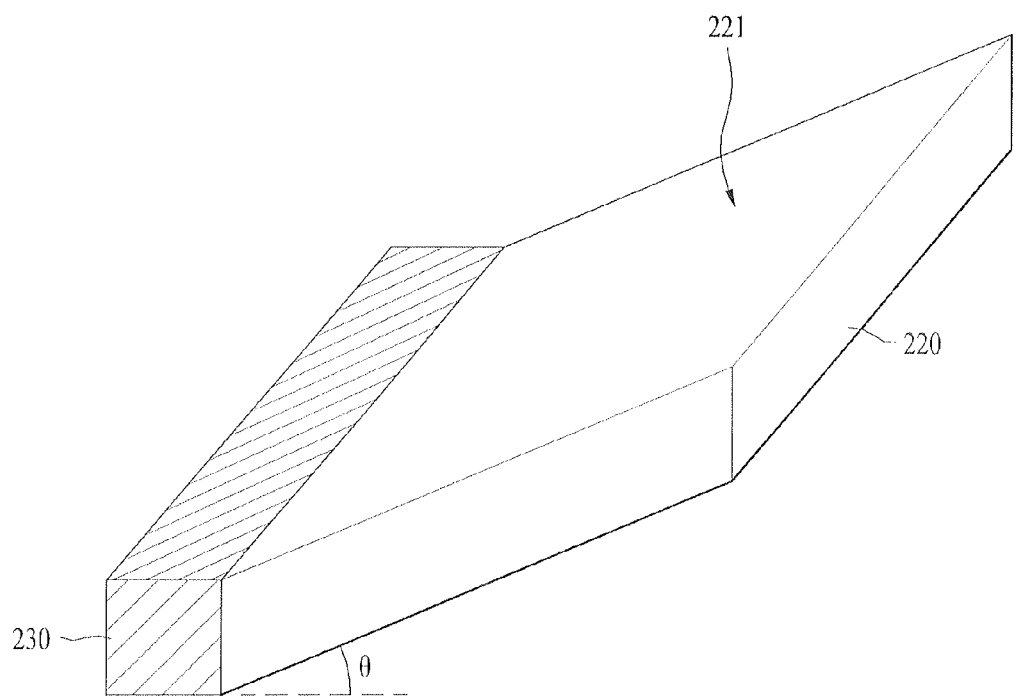

The reflector 200 may be configured according to various embodiments. FIGS. 3A and 3B illustrate an embodiment of the reflector of FIG. 1.

FIG. 3A is a sectional view of the reflector, and FIG. 3B is a perspective view of the reflector.

As illustrated in FIGS. 3A and 3B, a reflector 220 may be fixed to a fixture 230.

The reflector 220 may have a reflective surface 221 having a predetermined inclination angle $\Theta$ with respect to a horizontal plane so as to reflect light projected from the light source 100 in a predetermined direction. The fixture 230 may be attached to one side of the reflector 220 so as to fix the reflector 220.

Here, the reflector 220 and the fixture 230 may be made of conductive materials having high reflectivity or non-conductive materials as occasion demands.

To enhance light reflection efficiency of the reflector 220, a reflective layer 223 may be additionally formed on the reflective surface 221 of the reflector 220.

The reflective layer 223 may be a reflective coating film, or a reflective coating material layer formed by depositing a reflective material.

The reflective layer 223 may contain at least one of a metal and a metal oxide. For example, the reflective layer 223 may contain a metal or metal oxide having high reflectivity, such as Al, Ag, Au or $TiO_2$.

In this case, the reflective layer 223 may be formed by depositing or coating a metal or metal oxide on the reflective surface 221 of the reflector 220, or may be formed by printing metallic ink.

Here, deposition may be performed by thermal deposition, evaporation, or vacuum deposition such as sputtering, and coating or printing may be performed by gravure coating, silk screen printing, or the like.

The reflective layer 223 may take the form of a film or sheet and be attached to the reflective surface 221 of the reflector 220.

FIGS. 4A to 4D are views illustrating the reflective layer attached to the reflective surface of the reflector.

Figure 4A:
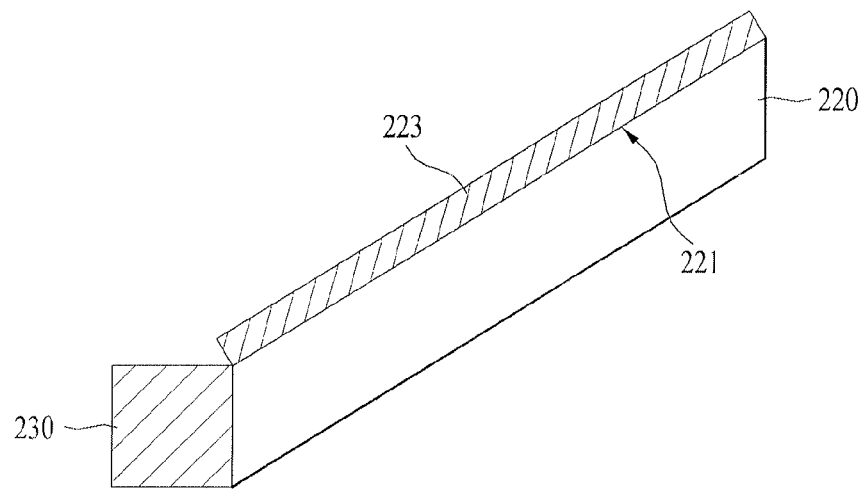
FIGS. 4A to 4D are views illustrating a reflective layer attached to a reflective surface of the reflector.
Figure 4B:
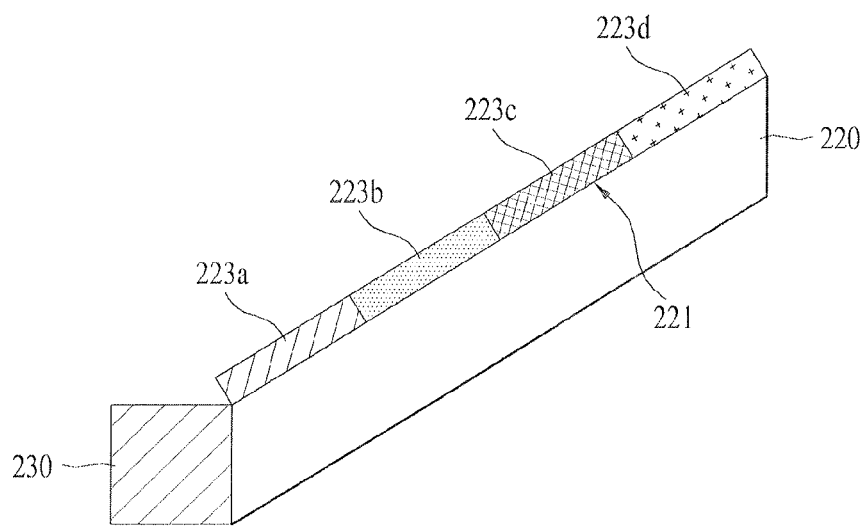
Figure 4C:
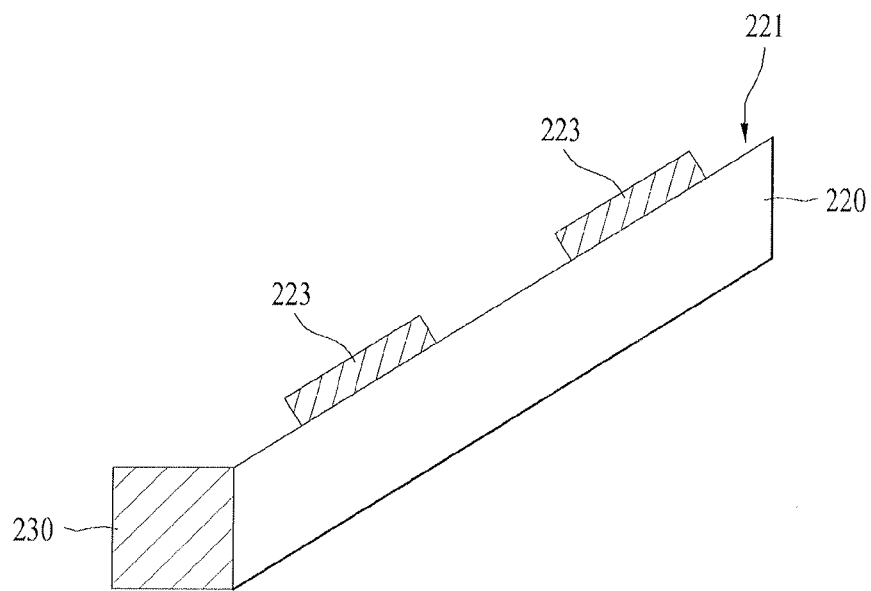
Figure 4D:
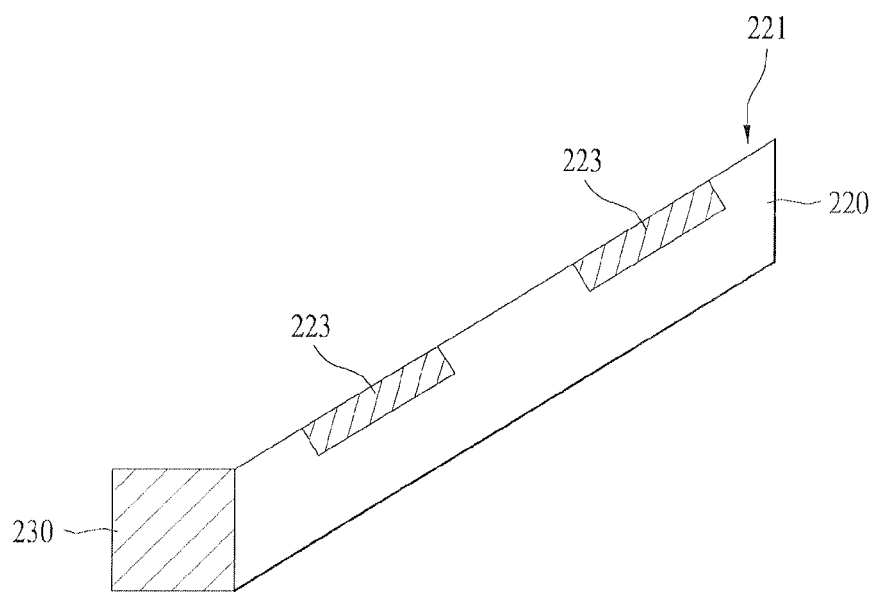

FIGS. 4A and 4B illustrate a configuration in which the reflective layer 223 is formed on the entire reflective surface 221 of the reflector 220, and FIGS. 4C and 4D illustrate a configuration in which the reflective layer 223 is formed on a part of the reflective surface 221 of the reflector 220.

Specifically, FIG. 4A illustrates a configuration in which the same reflective layer 223 is formed on the entire reflective surface 221, and FIG. 4B illustrates a configuration in which a plurality of reflective layers 223a, 223b, 223c and 223d having different reflectivities is formed on the entire reflective surface 221.

FIG. 4C illustrates a configuration in which the reflective layer 223 protrudes from partial regions of the reflective surface 221 of the reflector 220, and FIG. 4D illustrates a configuration in which recesses are indented in partial regions of the reflective surface 221 of the reflector 220 and the reflective layer 223 fills the recesses.

The reason why the plurality of reflective layers 223 having different reflectivities is formed or the reflective layer 223 is formed on only partial regions of the reflective surface 221 as illustrated in FIGS. 4B, 4C and 4D is that forming only the same reflective layer 223 on the reflective surface 221 may provide the entire reflective surface with irregular reflectivity, causing irregular luminance of the entire backlight unit.

Thus, by forming the reflective layer 223 having a relatively high reflectivity on a region of the reflective surface 221 having a low luminance as illustrated in FIG. 4B, or by forming the reflective layer 223 only on selected regions as illustrated in FIGS. 4C and 4D, it is possible to uniformly correct the luminance of the entire backlight unit.

As occasion demands, the reflective layer 223 may have a predetermined reflective pattern formed on a surface thereof, or the predetermined reflective pattern may be directly formed on the reflective surface 221 of the reflector 220.

Figure 5A:
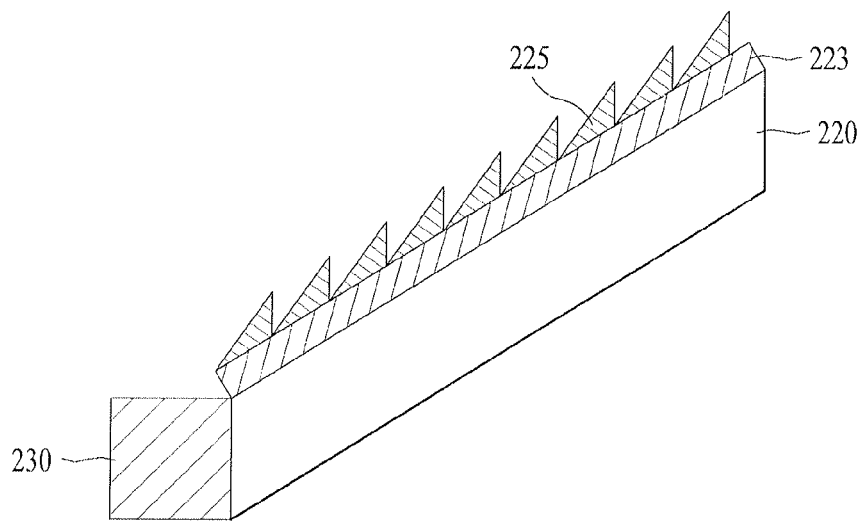
FIGS. 5A to 5C are views illustrating reflective layers having different reflective patterns.
Figure 5B:
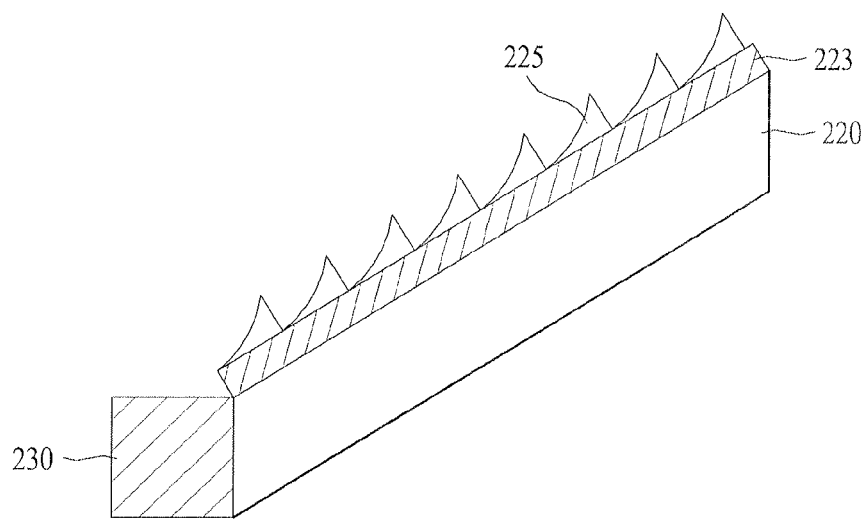
Figure 5C:
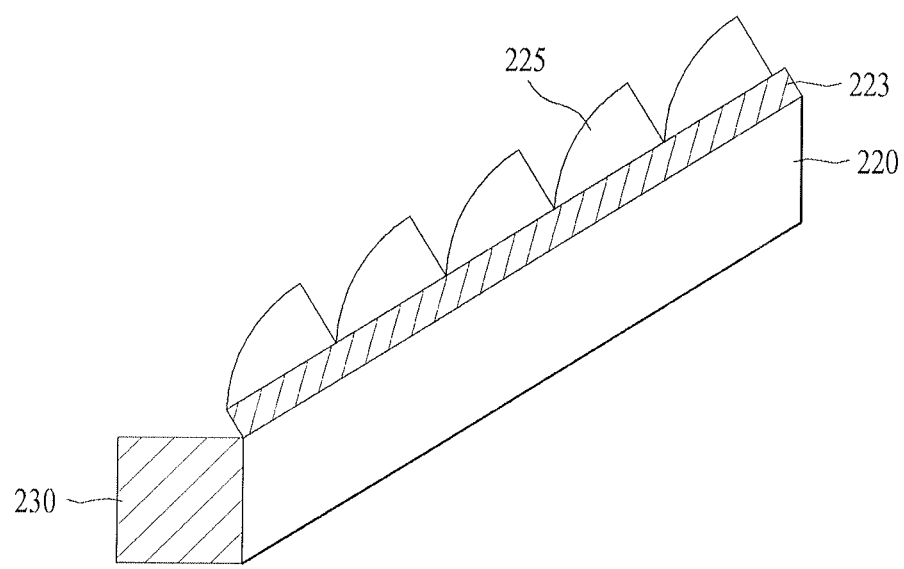

FIGS. 5A to 5C are views illustrating reflective layers having different reflective patterns.

FIGS. 5A to 5C illustrate a reflective pattern 225 having slopes inclined by a predetermined angle with respect to a horizontal plane. FIG. 5A illustrates flat slopes, FIG. 5B illustrates concave slopes, and FIG. 5C illustrates convex slopes.

As illustrated in FIGS. 5A to 5C, when the reflective pattern 225 is formed on the reflective layer 223, uniform diffusion and reflection of light may be obtained.

Here, the reflective pattern 225 may have the same shape as, or different shape from the reflective surface 221 of the reflector 220.

For example, if the reflective surface 221 of the reflector 220 has a flat inclined surface, the reflective pattern 225 formed on the reflective layer 223 may have flat slopes.

As occasion demands, the reflective pattern 225 may be a combination of a flat surface pattern and a curved surface pattern.

In addition, the reflective pattern 225 may consist of various sizes of patterns.

For example, the size of the reflective pattern 225 may gradually increase with increasing distance from a light source.

This is because a light incidence angle may vary and light luminance may be deteriorated with increasing distance from a light source.

Thus, if the size of the reflective pattern 225 increases with increasing distance from the light source, the inclination angle of the inclined surface of the reflective pattern 225 may be adjusted to reflect light toward a display panel thereabove to the maximum extent, which may increase diffusion efficiency of light.

Figure 6:
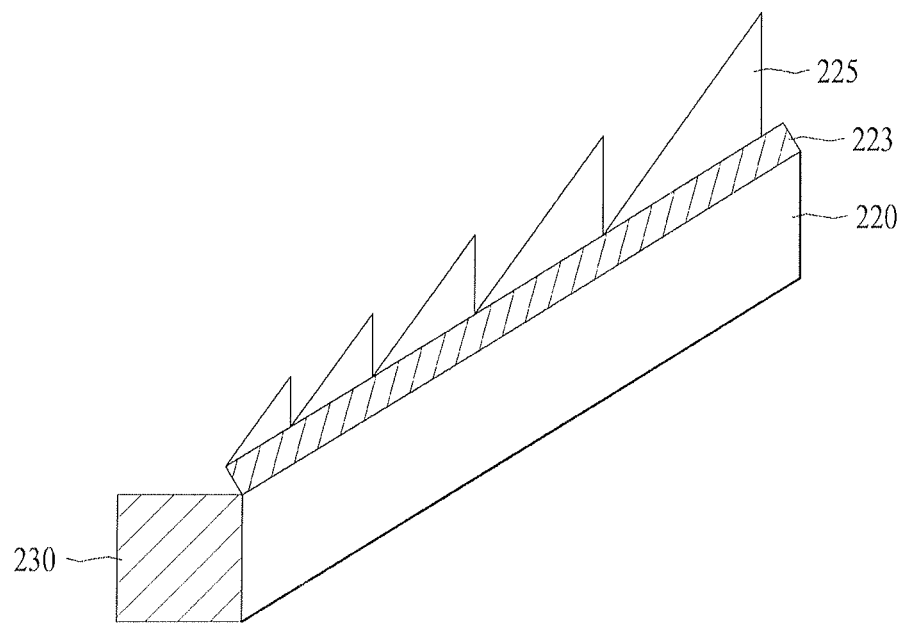
FIG. 6 is a view illustrating a reflective layer having an irregular reflective pattern.

FIG. 6 is a view illustrating a reflective layer having an irregular reflective pattern. As illustrated in FIG. 6, the size of the reflective pattern 225 formed on the reflective layer 223 increases with increasing distance from the light source.

The size of the reflective pattern 225 may vary on a per region basis according to luminance distribution of the entire backlight unit.

Figure 7A:
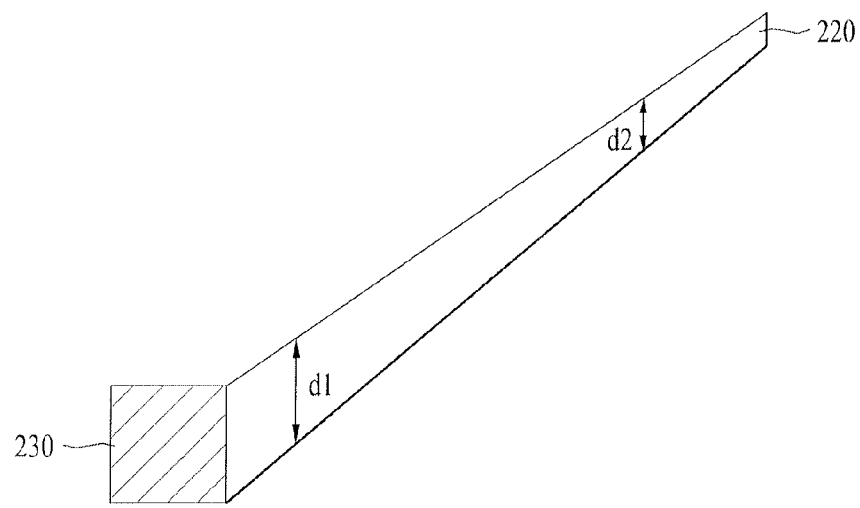
FIGS. 7A and 7B are views illustrating another embodiment of the reflector of FIG. 1.
Figure 7B:
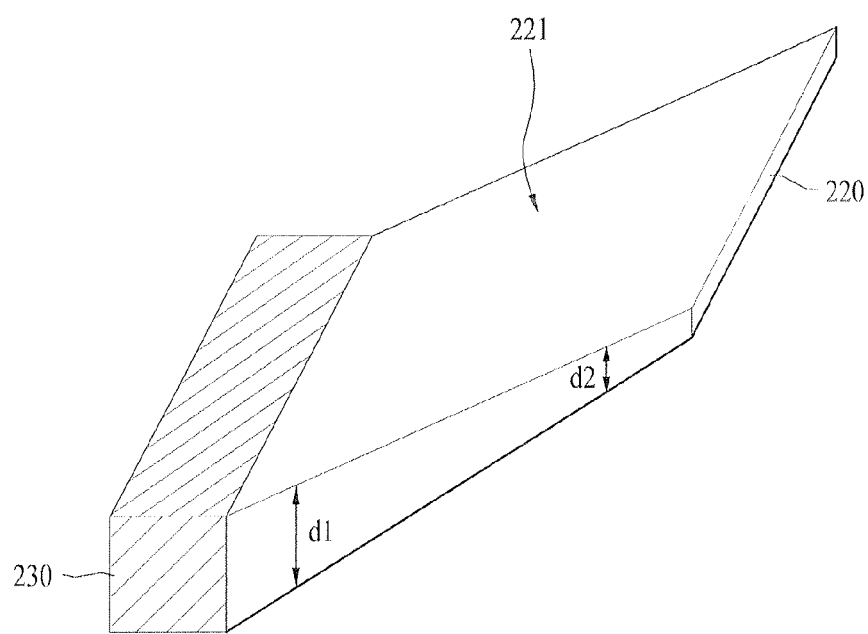

FIGS. 7A and 7B are views illustrating another embodiment of the reflector of FIG. 1. FIG. 7A is a sectional view of the reflector, and FIG. 7B is a perspective view of the reflector.

As illustrated in FIG. 7A, the thickness of the reflector 220 may gradually decrease with increasing distance from the fixture 230.

Specifically, a thickness d1 of a region of the reflector 220 close to the fixture 230 is greater than a thickness d2 of a region of the reflector 220 distant from the fixture 230.

This configuration has the effect of reducing the weight of the reflector 220 and consequently, reducing the weight of the entire backlight unit.

FIGS. 8A to 8F are views illustrating different connection relationship between the reflector and the fixture of FIG. 3A.

Figure 8A:
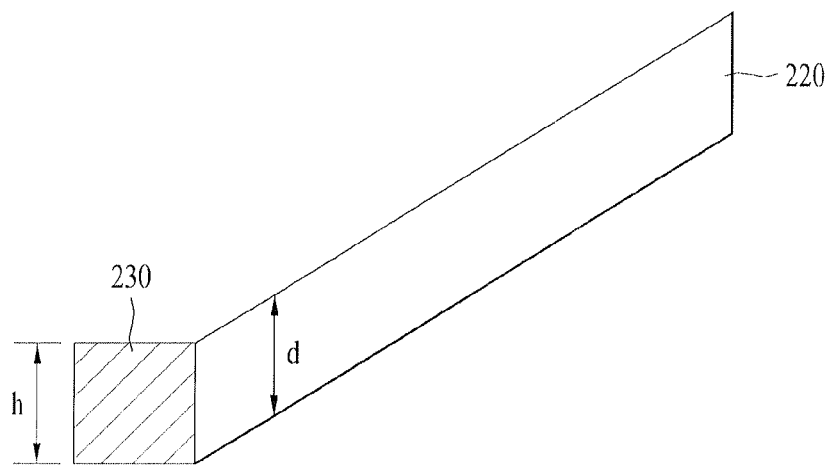
FIGS. 8A to 8F are views illustrating different connection relationship between the reflector and a fixture of FIG. 3A.

FIG. 8A illustrates a configuration in which one side of the reflector 220 is connected to the entire side surface of the fixture 230 and a thickness d of the reflector 220 is substantially equal to a height h of the side surface of the fixture 230.

Figure 8B:
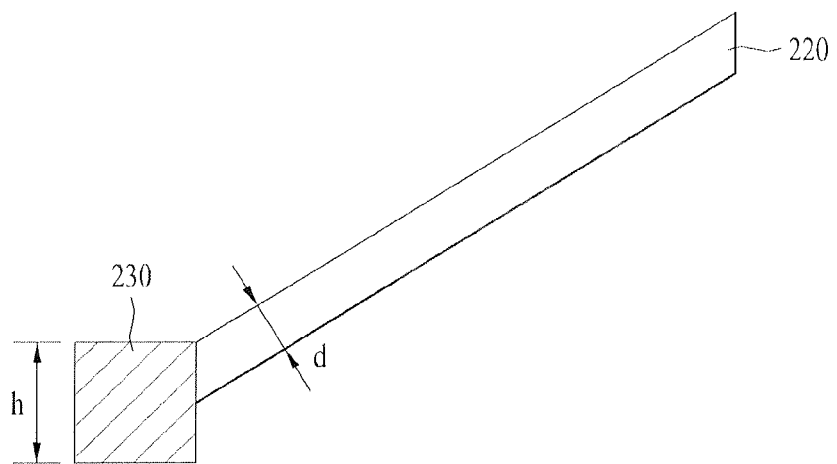
Figure 8C:
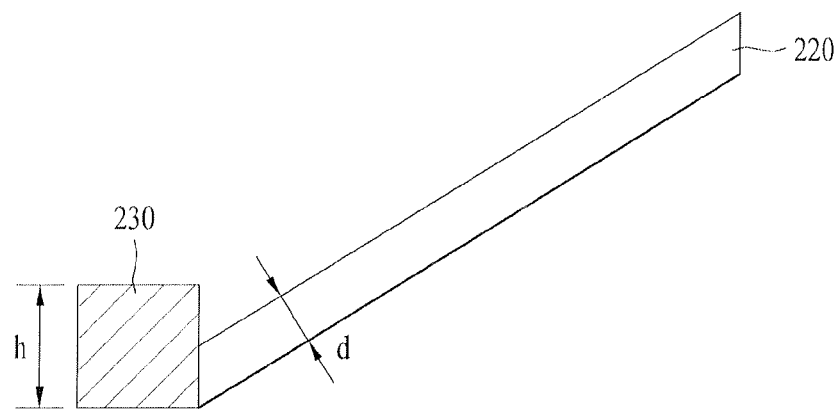

FIGS. 8B and 8C illustrate a configuration in which one side of the reflector 220 is connected to a part of the side surface of the fixture 230 and the thickness d of the reflector 220 is less than the height h of the side surface of the fixture 230.

Figure 8D:
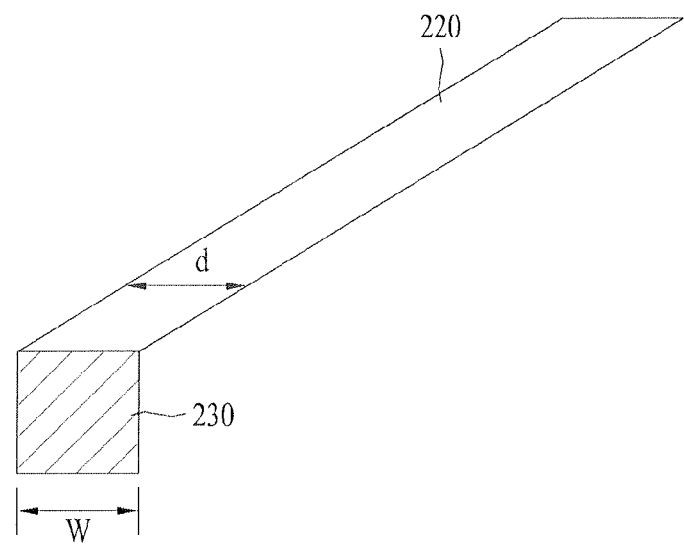

FIG. 8D illustrates a configuration in which one side of the reflector 220 is connected to the entire upper surface of the fixture 230 and the thickness d of the reflector 220 is substantially equal to a width w of the upper surface of the fixture 230.

Figure 8E:
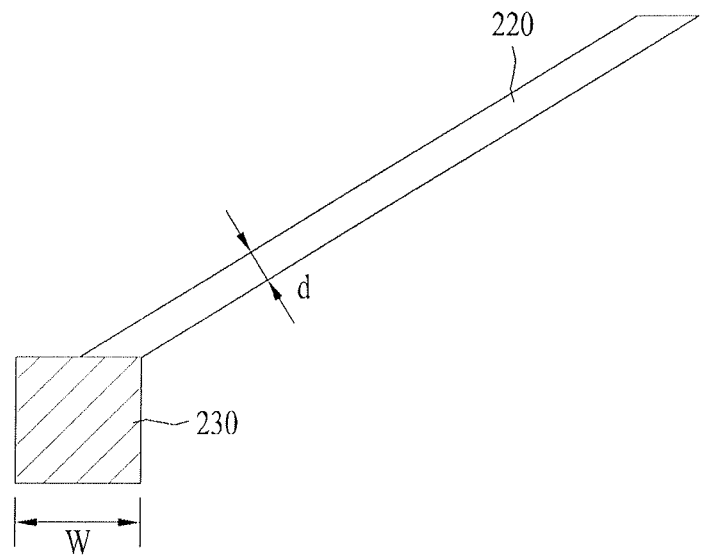
Figure 8F:
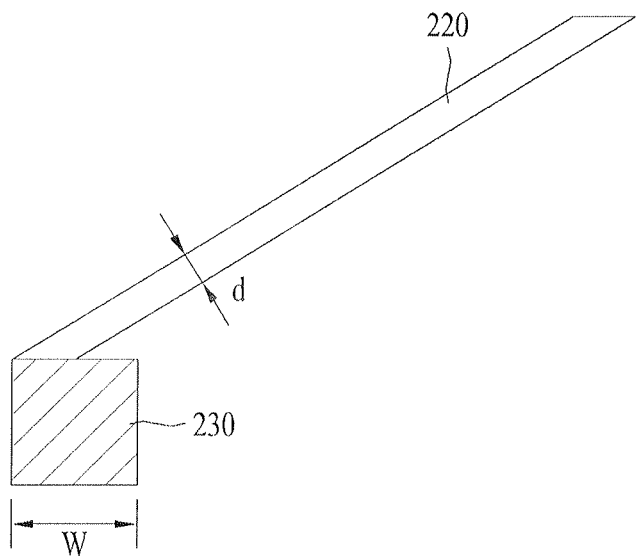

FIGS. 8E and 8F illustrate a configuration in which one side of the reflector 220 is connected to a part of the upper surface of the fixture 230 and the thickness d of the reflector 220 is less than the width w of the upper surface of the fixture 230.

Figure 9:
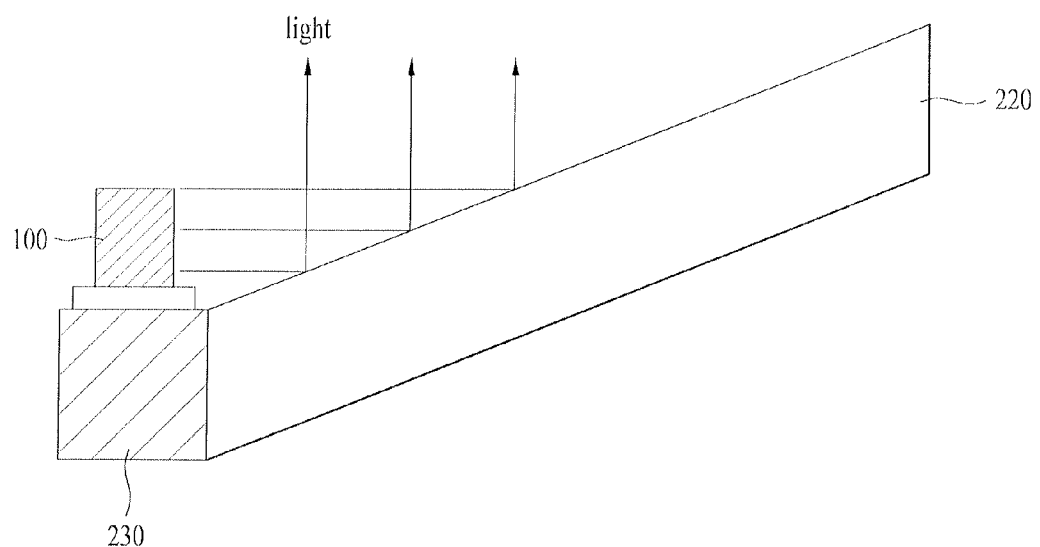
FIG. 9 is a view illustrating a light source coupled to the fixture of FIG. 3A.

FIG. 9 is a view illustrating the light source coupled to the fixture of FIG. 3A.

As illustrated in FIG. 9, the light source 100 may be mounted on the upper surface of the fixture 230.

If the light source 100 is mounted on the upper surface of the fixture 230, an additional structure for supporting the light source 100 is unnecessary, which may simplify the overall configuration.

Figure 10A:
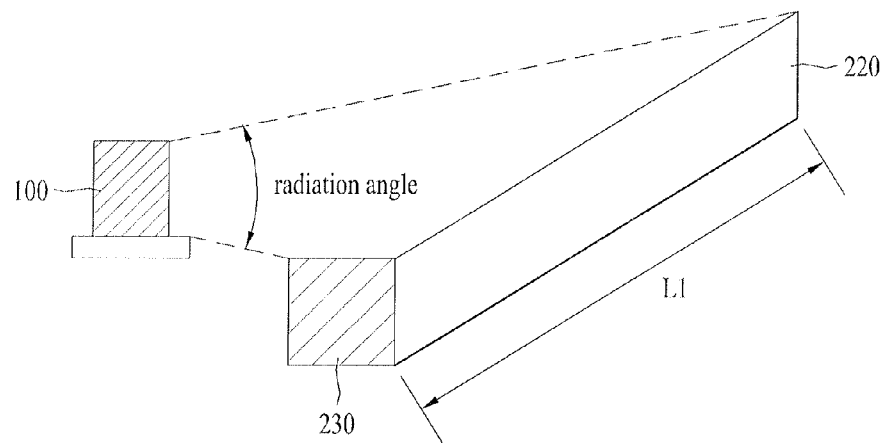
FIGS. 10A and 10B are views illustrating the length of the reflector of FIG. 3A.
Figure 10B:
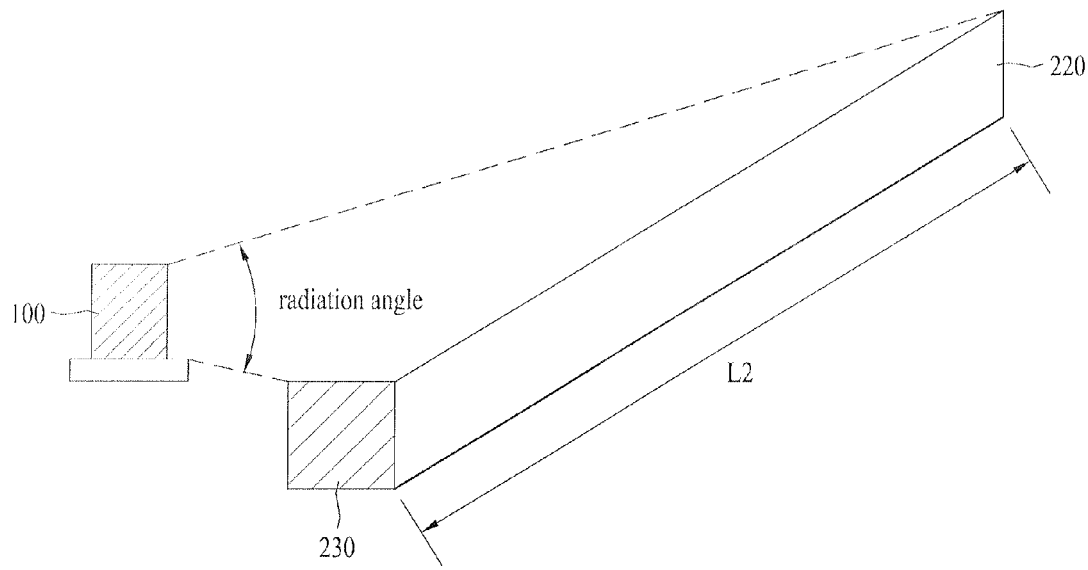

FIGS. 10A and 10B are views illustrating the length of the reflector of FIG. 3A.

FIG. 10A is a view illustrating the reflector of the backlight unit including a light source having a small light radiation angle, and FIG. 10B is a view illustrating the reflector of the backlight unit including a light source having a great light radiation angle.

As illustrated in FIG. 10A, if the light radiation angle of the light source is small substantially close to horizontal, the reflector 220 may have a minimum length L1.

As illustrated in FIG. 10B, if the light radiation angle is increased, the reflector 220 may have a length L2 increased to the maximum extent.

Minimizing the length of the reflector 220 may reduce the thickness of the entire backlight unit and to this end, the light source 100 may have the small light radiation angle.

As described above, the length of the reflector 220 may vary according to the light radiation angle of the light source.

Figure 11A:
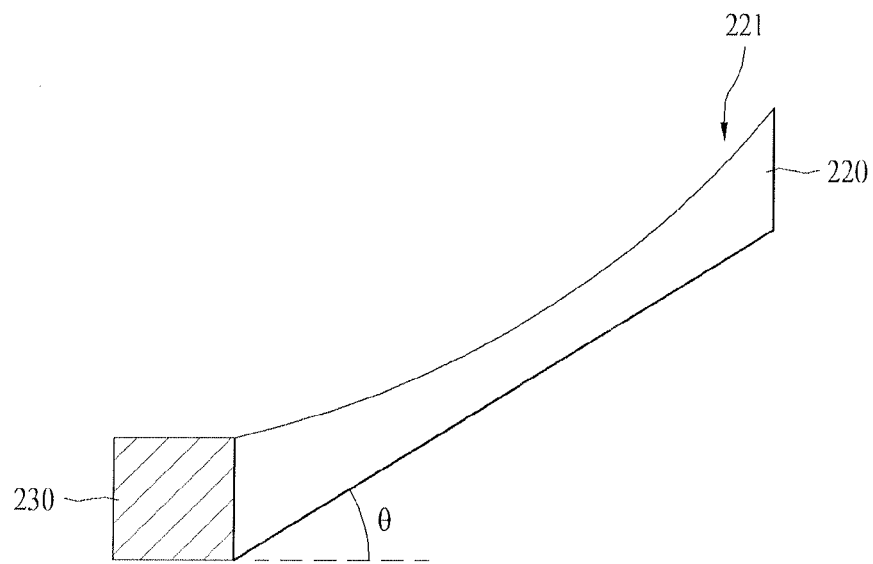
FIGS. 11A and 11B are views illustrating different reflective surface shapes of the reflector.
Figure 11B:
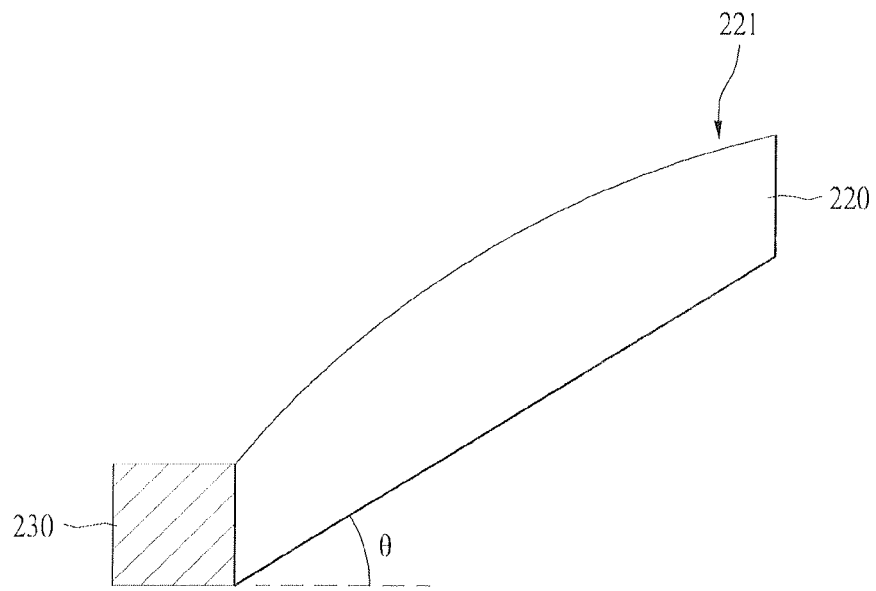

FIGS. 11A and 11B are views illustrating different reflective surface shapes of the reflector. FIG. 11A is a view illustrating the concave reflective surface 221 as compared to a flat surface, and FIG. 11B is a view illustrating the convex reflective surface 221 as compared to a flat surface.

As illustrated in FIGS. 11A and 11B, the reflective surface 221 of the reflector 220 has an inclination angle of about 0~85 degrees with respect to a horizontal plane and may be concave or convex.

Figure 12A:
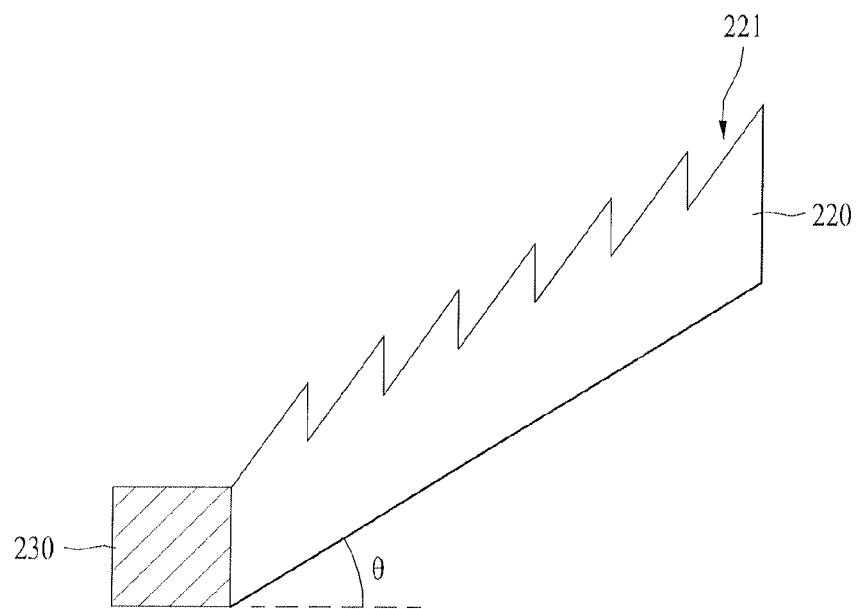
FIGS. 12A to 12D are views illustrating different reflective pattern shapes of the reflector.
Figure 12B:
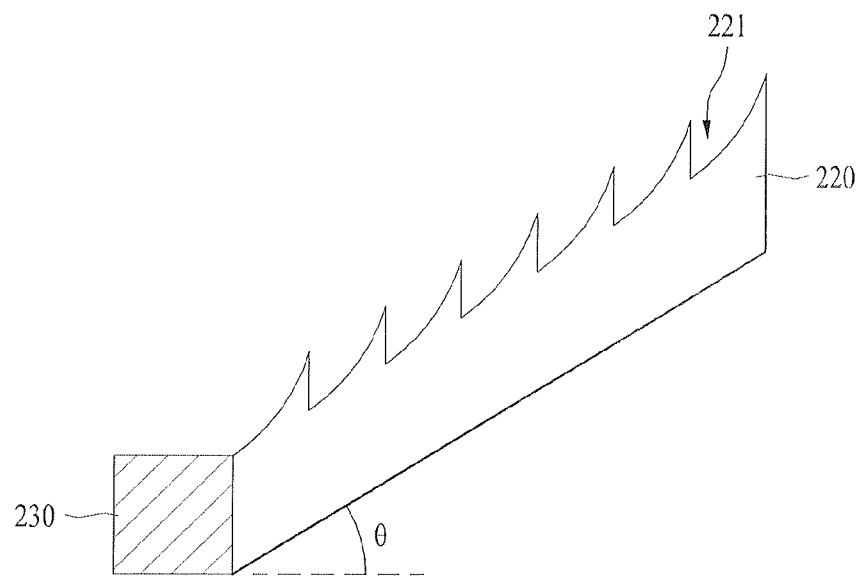
Figure 12C:
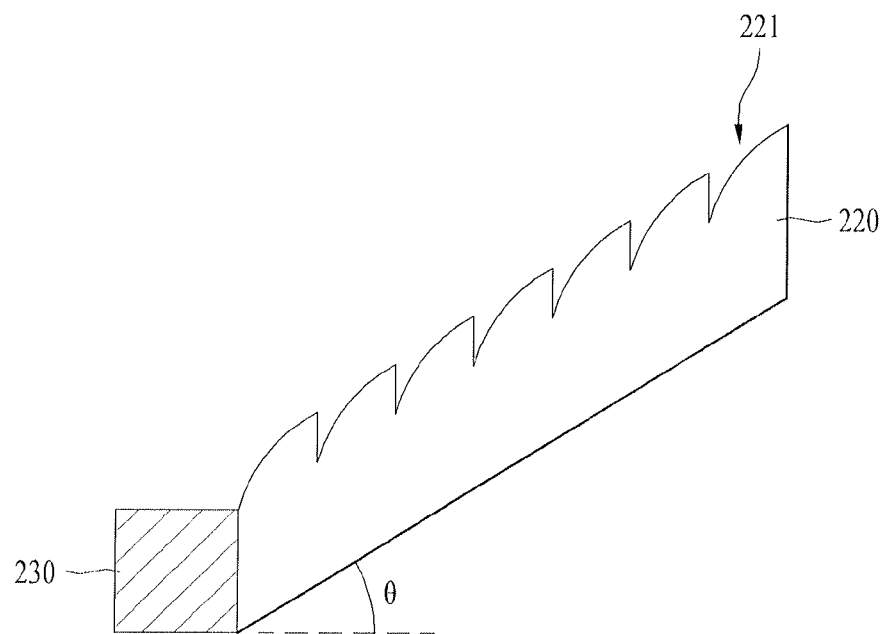

FIGS. 12A to 12D are views illustrating different reflective pattern shapes of the reflector. FIG. 12A illustrates a roughened pattern shape, a surface of which is flat, FIG. 12B illustrates a roughened pattern shape, a surface of which is concave, FIG. 12C illustrates a roughened pattern shape, a surface of which is concave, and FIG. 12C illustrates an irregularly roughened pattern shape.

As illustrated in FIGS. 12A to 12D, the reflective surface 221 of the reflector 220 may have an inclination angle of about 0~85 degrees with respect to a horizontal plane and may be provided with a roughened reflective pattern.

Providing the reflective surface 221 of the reflector 220 with various shapes of the reflective pattern enables uniform diffusion and reflection of light.

The roughened reflective pattern may have a flat surface as illustrated in FIG. 12A, a concavely curved surface as illustrated in FIG. 12B, or a convexly curved surface as illustrated in FIG. 12C.

Specifically, the reflective surface 221 of the reflector 220 is defined by saw teeth each having a first face and a second face, and an angle between the first face and the second face may be at least one of an acute angle and an obtuse angle.

As occasion demands, the reflective pattern of the reflector may be a combination of a roughened pattern having a flat surface, a roughened pattern having a concave surface and a roughened pattern having a convex surface.

In addition, the reflective pattern of the reflector may be a combination of various sizes of patterns.

Figure 12D:
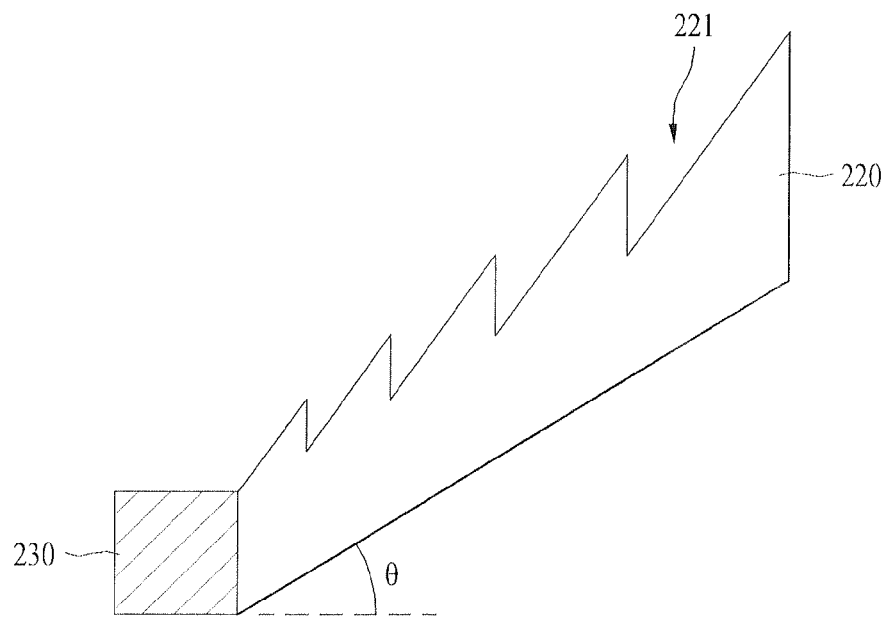

For example, as illustrated in FIG. 12D, the size of the reflective pattern of the reflector may gradually increase with increasing distance from the light source.

This is because a light incidence angle may vary and light luminance may be deteriorated with increasing distance from the light source.

Thus, increasing the size of the reflective pattern with increasing distance from the light source has the effect of adjusting the inclination angle of the slopes of the reflective pattern, thereby maximizing upward reflection and diffusion efficiency of light.

Figure 13:
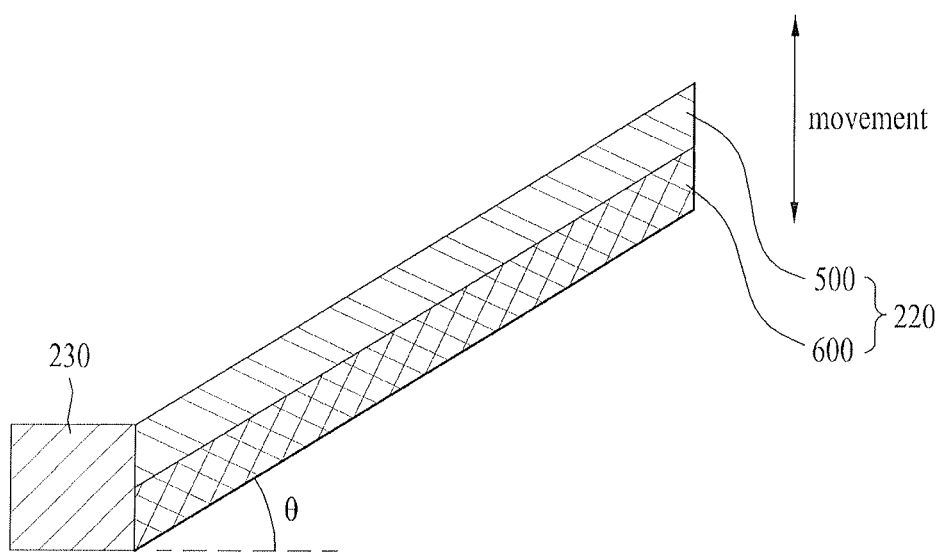
FIG. 13 is a view illustrating another embodiment of the reflector of FIG. 1.

FIG. 13 is a view illustrating another embodiment of the reflector of FIG. 1. As illustrated in FIG. 13, the reflector 220 may be moved such that an inclination angle thereof varies.

Specifically, FIG. 13 is a view illustrating a movable reflector. As illustrated in FIG. 13, the reflector 220 may be made of first and second materials 500 and 600 having different coefficients of thermal expansion.

For example, the reflector 220 may be formed by stacking two kinds of thin metal plates, which have different coefficients of thermal expansion, i.e. different expansion and contraction degrees depending on temperature variation one above another.

One metal plate having a greater coefficient of thermal expansion expands more and is bent with increasing temperature and then returns to an original state thereof with decreasing temperature.

Examples of metals which do not readily expand include Ni and Fe alloys, and examples of metals which rapidly expand include Ni, Mn and Fe alloys, Ni, Mo and Fe alloys, Ni, Mn and Cu alloys, etc.

Thus, when the reflector 220 is made of the above described two materials and an electric circuit is provided to apply current or heat to the reflector 220, adjusting the inclination angle of the reflector 220 is possible.

Thereby, adjusting a reflection angle of light is also possible, which ensures more efficient and uniform transmission of light.

As occasion demands, the reflector 220 may be precisely moved using electrostatic force, electromagnetic force, piezo-electric force, etc.

Figure 14:
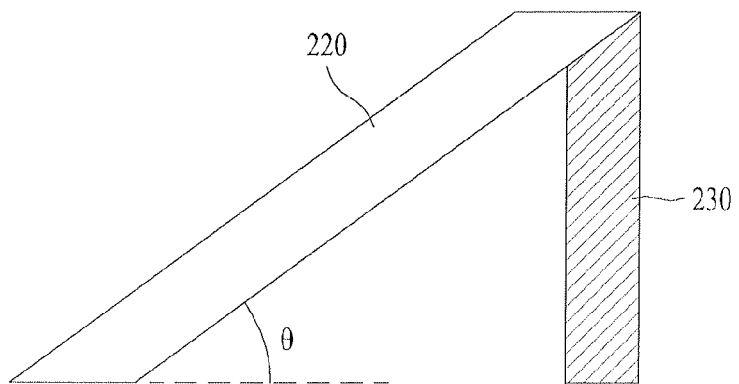
FIGS. 14 and 15 are views illustrating another embodiment of the reflector of FIG. 1.
Figure 15:
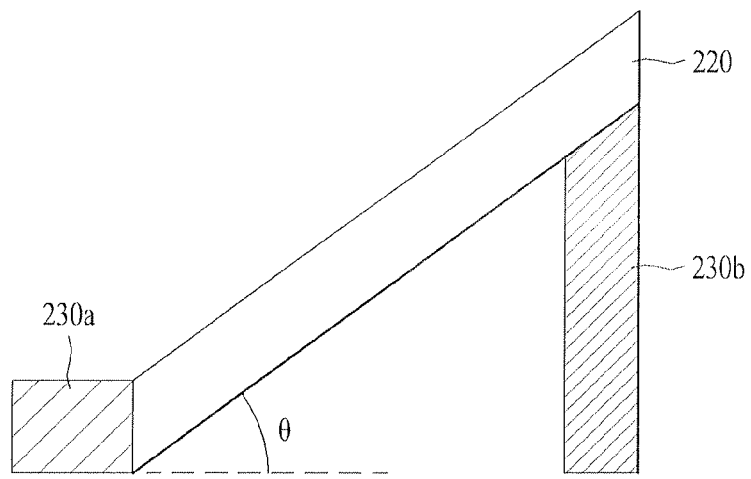

FIGS. 14 and 15 are views illustrating another embodiment of the reflector of FIG. 1.

FIG. 14 illustrates a configuration in which the fixture 230 is coupled to an upper end of the inclined reflector 220, and FIG. 15 illustrates a configuration in which two fixtures 230a and 230b are coupled respectively to upper and lower ends of the inclined reflector 220.

FIGS. 14 and 15 illustrate a stable reflector configuration. In FIG. 14, the reflector 220, which has a reflective surface inclined by an angle of about 0~85 degrees with respect to a horizontal plane, is equipped at an upper region thereof with the fixture 230 extending in a direction perpendicular to the horizontal plane.

In FIG. 15, the reflector 220, which has a reflective surface inclined by an angle of about 0~85 degrees with respect to a horizontal plane, is equipped at a lower region thereof with a first fixture 230a and at an upper region thereof with a second fixture 230b extending in a direction perpendicular to the horizontal plane.

Here, although the reflector provided with the two fixtures as illustrated in FIG. 15 has a more stable configuration than the reflector provided with the single fixture as illustrated in FIG. 14, the reflector of FIG. 15 may be disadvantageously heavier than the reflector of FIG. 14.

Figure 16A:
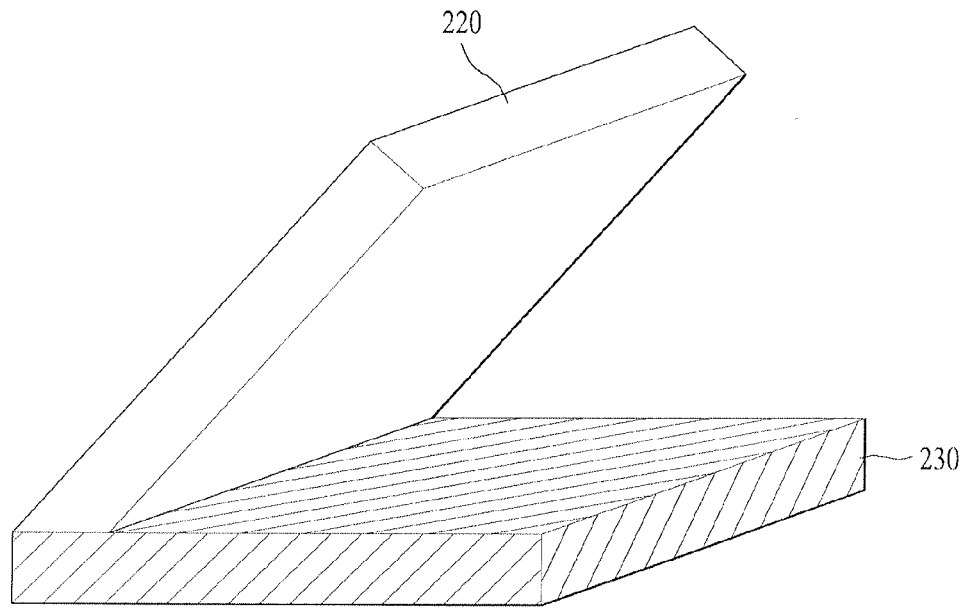
FIGS. 16A to 16C are views illustrating another embodiment of the reflector of FIG. 1.
Figure 16B:
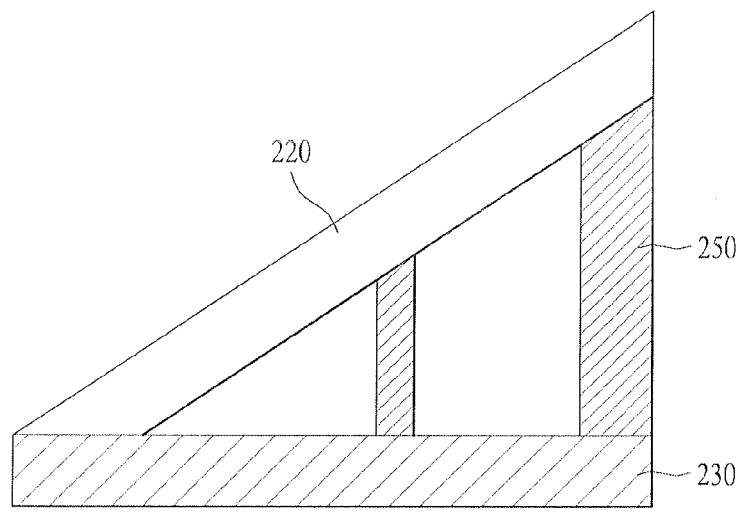
Figure 16C:
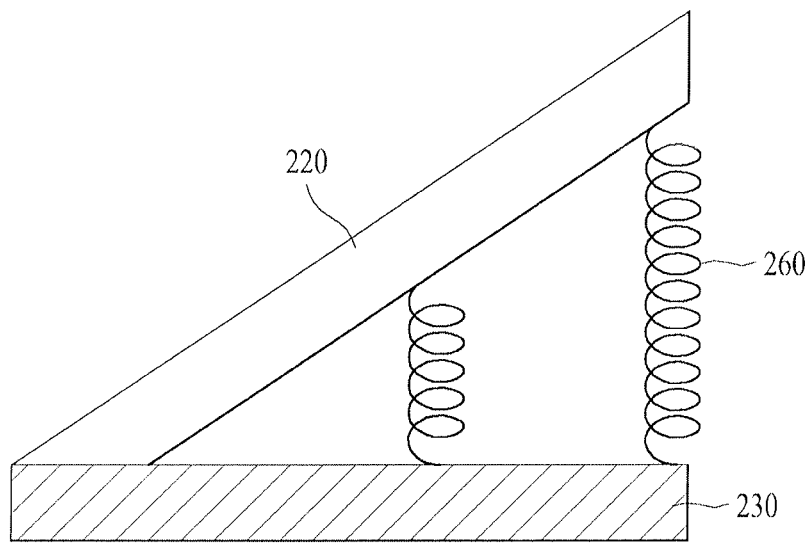

FIGS. 16A to 16C are views illustrating another embodiment of the reflector of FIG. 1. As illustrated in FIGS. 16A to 16C, the fixture 230 is located below the reflective surface of the reflector 220.

Specifically, a lower surface of the reflector 220 is disposed to face an upper surface of the fixture 230, and a distance between the lower surface of the reflector 220 and the upper surface of the fixture 230 gradually increases with increasing distance from a connection location of the reflector 220 and the fixture 230.

Since a configuration of FIG. 16A causes change of the inclination angle of the reflective surface when external shock is applied to the reflector 220, at least one spacer 250 may be additionally installed between the lower surface of the reflector 220 and the upper surface of the fixture 230 as illustrated in FIG. 16B, or at least one elastic member 260 may be additionally installed between the lower surface of the reflector 220 and the upper surface of the fixture 230 as illustrated in FIG. 16C.

Here, then elastic member 260 may be a spring, a thermoplastic elastic structure, or the like.

Figure 17:
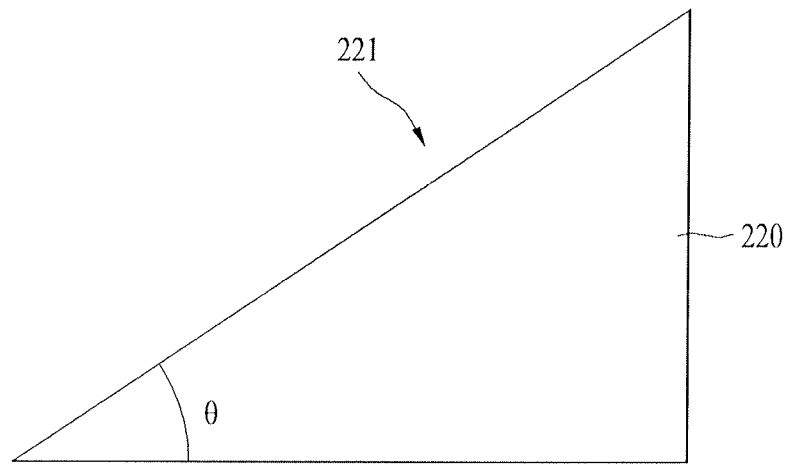
FIGS. 17 and 18 are views illustrating another embodiment of the reflector of FIG. 1.
Figure 18:
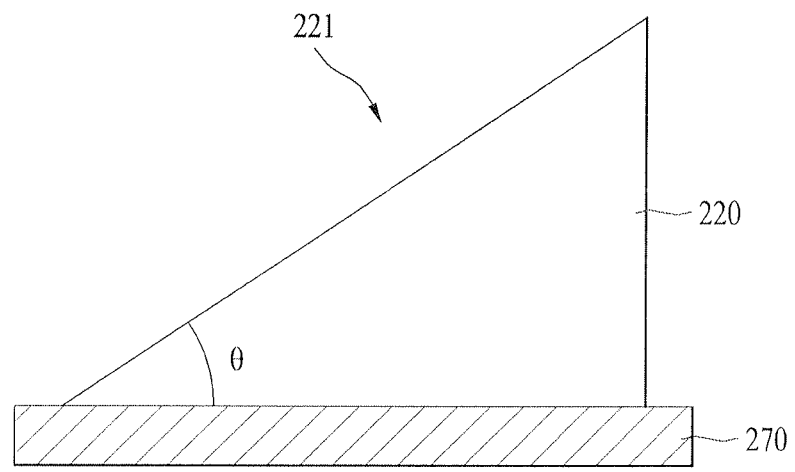

FIGS. 17 and 18 are views illustrating another embodiment of the reflector of FIG. 1. As illustrated in FIGS. 17 and 18, the reflector and the fixture may be integrally formed with each other.

In FIG. 17, the reflective surface 221 of the reflector 220 may be inclined by an angle of about 0~85 degrees with respect to the lower surface of the reflector 220.

In this case, the reflector may have a right triangular cross section, and the thickness of the reflector 220 may gradually increase with increasing distance from the light source.

In FIG. 18, the reflective surface 221 of the reflector 220 may be inclined by an angle of about 0~85 degrees with respect to the lower surface of the reflector 220 and a support plate 270 to support the reflector 220 may be additionally provided.

Similarly, the reflector may have a right triangular cross section, and the thickness of the reflector 220 may gradually increase with increasing distance from the light source.

Figure 19:
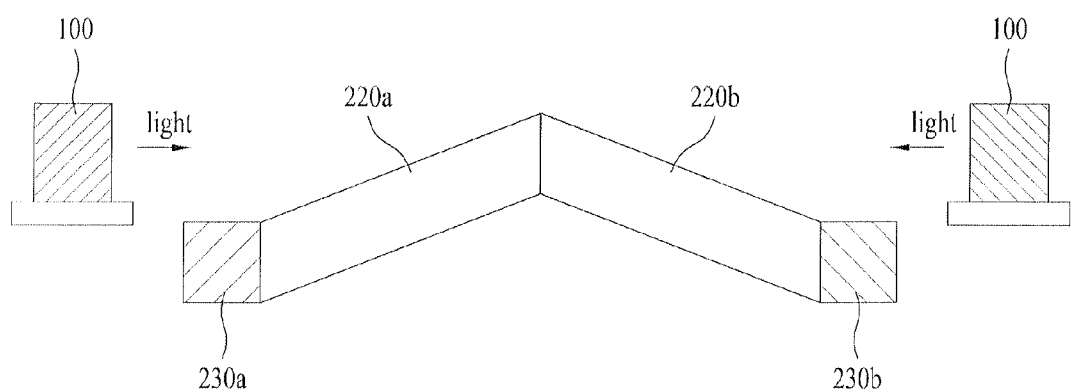
FIG. 19 is a view illustrating the reflector positioned between two light sources.

FIG. 19 is a view illustrating the reflector positioned between a pair of light sources.

As illustrated in FIG. 19, the reflector positioned between the two light sources 100 may include two reflectors 220a and 220b coupled to face each other.

Although the fixtures 230a and 230b are illustrated as being attached to the respective reflectors 220a and 220b, all the above described various configurations of the fixtures may be applied to the reflectors.

As such, a backlight unit may be fabricated such that two reflectors are coupled to face each other to construct a single reflection structure and two light sources are positioned respectively at opposite sides of the reflection structure.

Figure 20A:
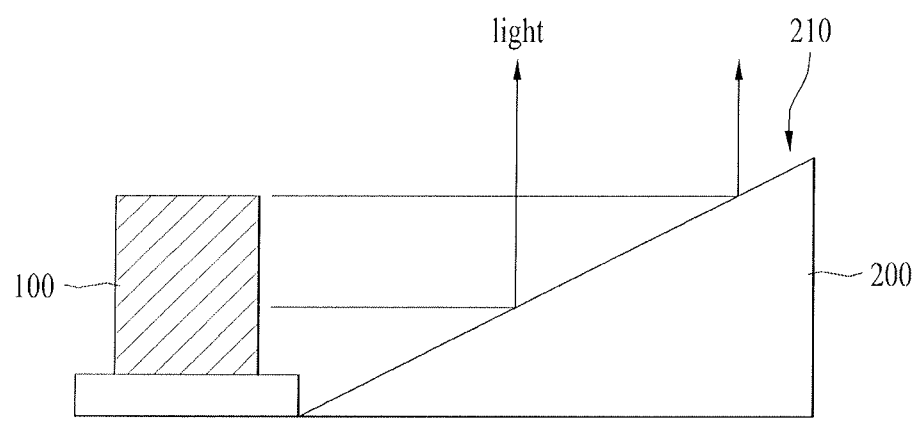
FIGS. 20A and 20B are views illustrating a positional relationship between the reflector and the light source.
Figure 20B:
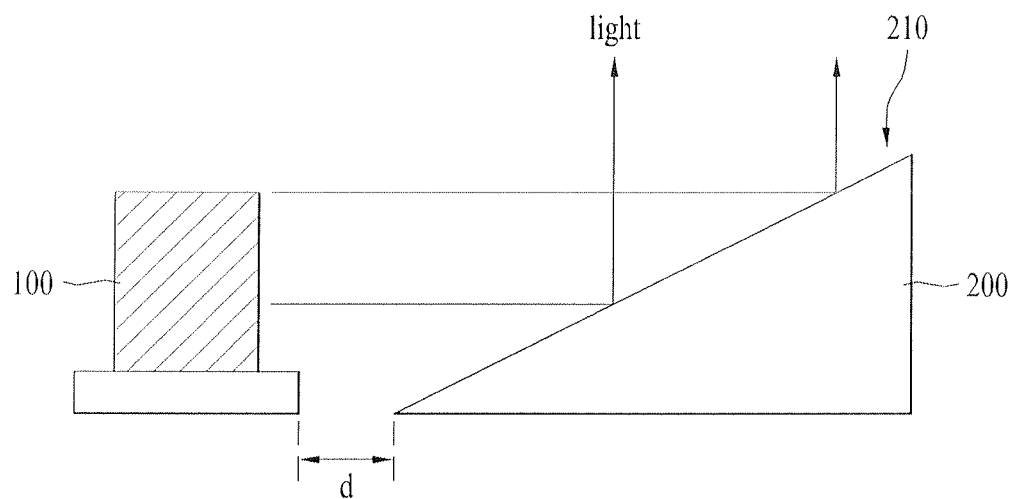

FIGS. 20A and 20B are views illustrating a positional relationship between the reflector and the light source. FIG. 20A illustrates a configuration in which the light source 100 is positioned to come into contact with at least one side of the reflector 200, and FIG. 20B illustrates a configuration in which the light source 100 is spaced apart from the reflector 200 by a predetermined distance d.

The distance between the reflector 200 and the light source 100 may vary according to a light orientation angle of the light source 100, a layout of constituent elements of the backlight unit, etc.

In the present embodiment, a mirror may be additionally installed to the light source. The mirror serves to reduce the light orientation angle of the light source such that light substantially horizontally moves.

Figure 21:
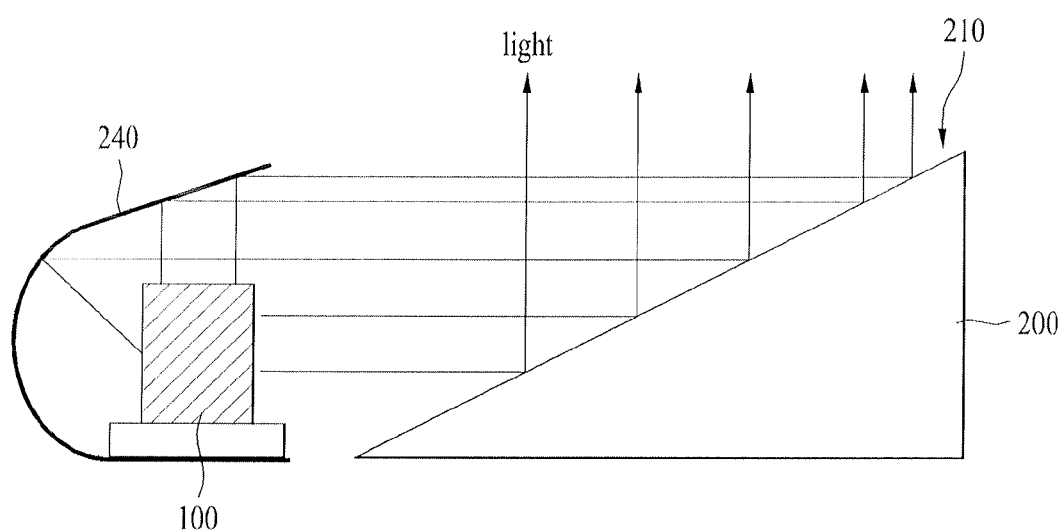
FIG. 21 is a view illustrating a backlight unit including a light source provided with a mirror.

FIG. 21 is a view illustrating a backlight unit including a light source provided with a mirror. As illustrated in FIG. 21, the backlight unit of the present embodiment may include the reflector 200 provided with the reflective surface having a predetermined gradient, the light source 100 disposed on at least one side of the reflector 200 so as to emit light, and a mirror 240 to reflect the light of the light source 100 toward the reflective surface of the reflector 200.

The mirror 240 may be configured to surround the light source 100 except for a light emission direction.

Thus, light emitted from the light source 100 may directly move toward the reflective surface of the reflector 200, or may be reflected from the reflector 200 so as to indirectly move toward the reflective surface of the reflector 200.

In this case, since the mirror 240 serves to reduce the orientation angle of the light emitted from the light source 100, most of the light may horizontally move toward the reflective surface of the reflector 200 and the light reflected from the reflective surface of the reflector 200 may be uniformly transmitted to a display panel.

Figure 22A:
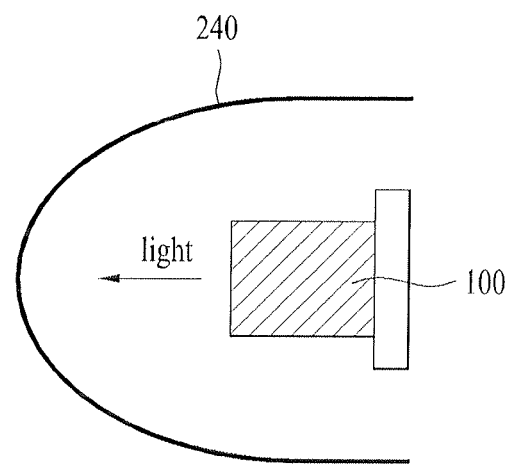
FIGS. 22A to 22C are views illustrating a positional relationship between the mirror and the light source according to one embodiment.
Figure 22B:
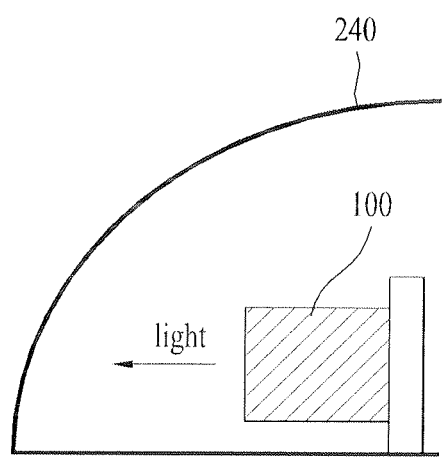
Figure 22C:
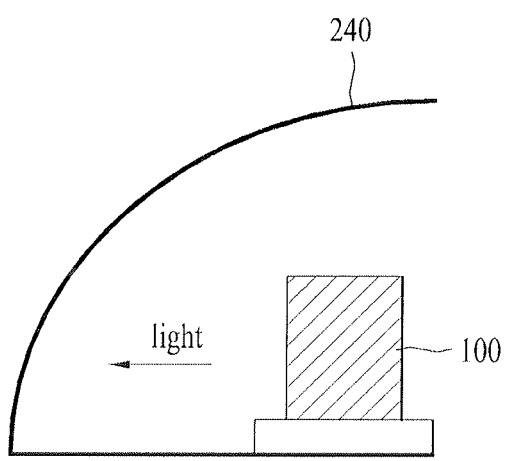
Figure 23A:
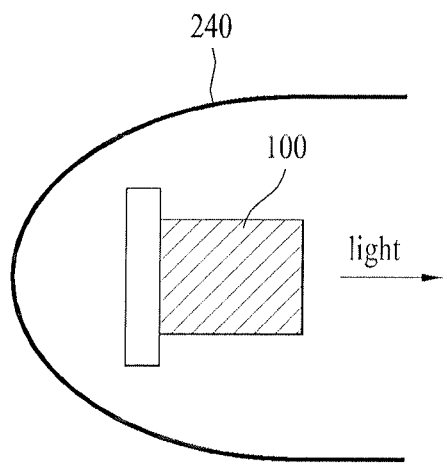
FIGS. 23A to 23C are views illustrating a positional relationship between the mirror and the light source according to another embodiment.
Figure 23B:
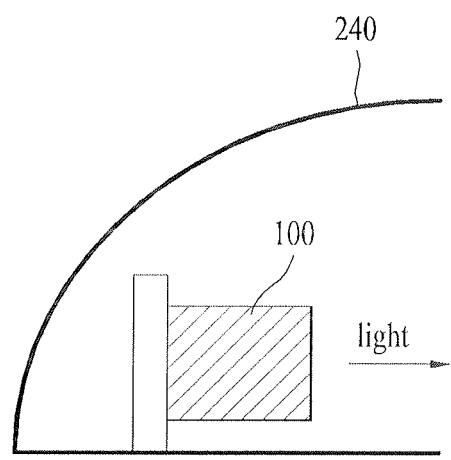
Figure 23C:
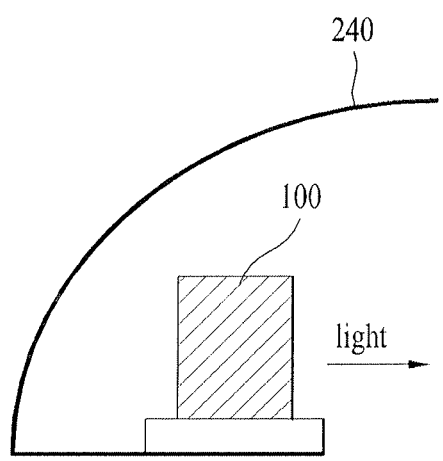

FIGS. 22A to 22C are views illustrating a positional relationship between the mirror and the light source according to one embodiment, and FIGS. 23A to 23C are views illustrating a positional relationship between the mirror and the light source according to another embodiment.

In FIGS. 22A to 22C, the mirror 240 is disposed to face a light emission surface of the light source 100. In FIGS. 23A to 23C, the mirror 240 is disposed at an opposite side of the light emission surface of the light source 100.

FIG. 22A illustrates a configuration in which the light emission surface of the vertical light source 100 faces the mirror 240 and the mirror 240 has a U-shaped cross section opened in an opposite direction of the light emission surface of the light source 100.

FIG. 22B illustrates a configuration in which the light emission surface of the vertical light source 100 faces the mirror 240 and the mirror 240 has a quarter-spherical cross section opened in an opposite direction of the light emission surface of the light source 100.

FIG. 22C illustrates a configuration in which the light emission surface of the horizontal light source 100 faces the mirror 240 and the mirror 240 has a quarter-spherical cross section opened in an opposite direction of the light emission surface of the light source 240.

FIG. 23A illustrates a configuration in which the light emission surface of the vertical light source 100 does not face the mirror 240 and the mirror 240 has a U-shaped cross section opened in the same direction as the light emission surface of the light source 100.

FIG. 23B illustrates a configuration in which the light emission surface of the vertical light source 100 faces the mirror 240 and the mirror 240 has a quarter-spherical cross section opened in the same direction as the light emission surface of the light source 100.

FIG. 23C illustrates a configuration in which the light emission surface of the horizontal light source 100 faces the mirror 240 and the mirror 240 has a quarter-spherical cross section opened in the same direction as the light emission surface of the light source 100.

In addition to the above described configurations, the mirror 240 may take the form of a polygon having at least one bent surface.

In addition, although the present embodiment employs the mirror 240 to allow light to horizontally move, the mirror 240 may be replaced by a lens provided in front of light emission surface of the light source 100 or any other structure having a particular shape to expose the light emission surface of the light source 100.

Figure 24:
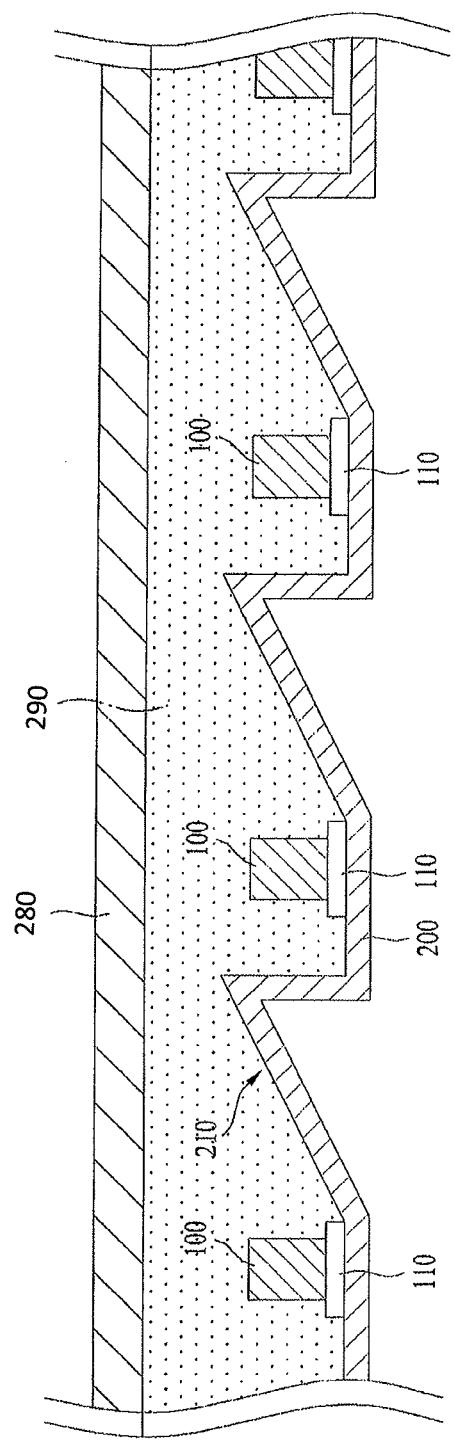
FIGS. 24 to 26 are views illustrating various embodiments of a backlight unit including a reflector.
Figure 25:
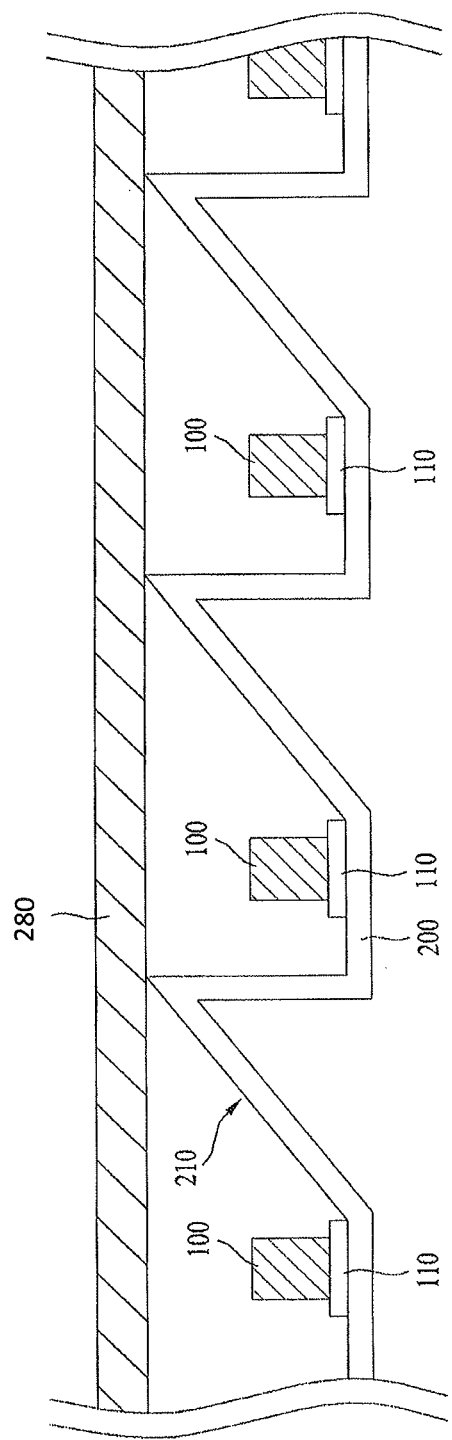
Figure 26:
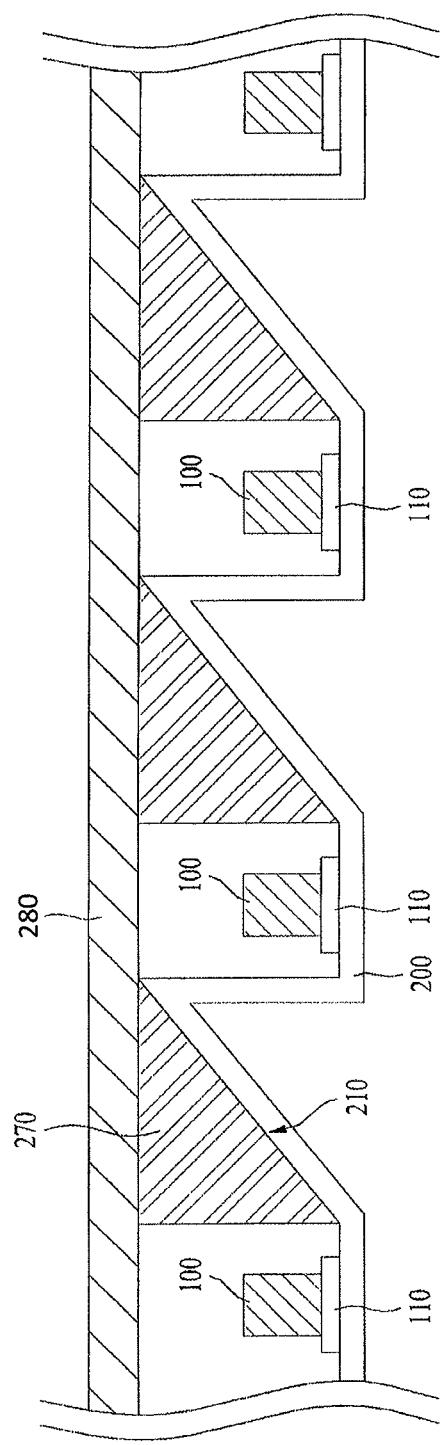

FIGS. 24 to 26 are views illustrating various embodiments of the backlight unit including the reflector.

The backlight unit illustrated in FIG. 24 may include the light source 100, the reflector 200, a light-shield sheet 280, and a transparent resin layer 290.

The light source 100 may be formed on a circuit board 110 equipped with various circuit electrodes.

The circuit board 110 may be equipped with an electrode pattern (not shown) to connect a power supply adaptor (not shown) and the light source 100 to each other.

For example, a carbon nanotube electrode pattern (not shown) may be formed on an upper surface of the circuit board 110 so as to connect the light source 100 and the adaptor (not shown) to each other.

The circuit board 110 may be a Printed Circuit Board (PCB) made of polyethylene terephthalate (PET), glass, polycarbonate (PC), silicon (Si), or the like, or may take the form of a film.

The light source 100 may be a Light Emitting Diode (LED) chip or an LED package including at least one LED chip.

The light source 100 may consist of colored LEDs to emit at least one color of red, green and blue, or colorless LEDs.

The colored LEDs may include at least one of red LEDs, blue LEDs and green LEDs. These LEDs may be arranged in a variety of ways and may emit light of a variety of colors.

The reflector 200 supports the light source 100 and the circuit board 110 and includes the reflective surface 210 having a predetermined inclination angle with respect to a horizontal plane parallel to a surface of the light-shield sheet 280.

Here, the reflective surface 210 of the reflector 200 may be positioned at one side of the light source 100 and a support structure extending perpendicular to the horizontal plane may be positioned at the other side of the light source so as to support the reflective surface 210.

A reflective sheet may be attached to the reflective surface 210 of the reflector 200. The reflective sheet serves to reflect light emitted from the light source 100.

The reflective sheet may contain at least one metal or metal oxide reflective material. For example, the reflective sheet may be made of a metal or metal oxide having high reflectivity, such as Al, Ag, Au or $TiO_2$.

In this case, the reflective sheet may be formed by depositing or coating a metal or metal oxide on the reflective surface 210 of the reflector 200, or may be formed by printing metallic ink.

Here, deposition may be performed by thermal deposition, evaporation, or vacuum deposition such as sputtering, and coating or printing may be performed by gravure coating, silk screen printing, or the like.

In addition, the reflective sheet may be additionally provided with a reflective pattern. The reflective pattern serves to diffuse or refract the light emitted from the light source 100.

The size of the reflective pattern may increase with increasing distance from the light source 100.

This is because light luminance may be deteriorated with increasing distance from the light source 100 and increasing the size of the reflective pattern may increase diffusion or refraction efficiency of light, achieving uniform luminance even at a region distant from the light source 100.

To improve diffusion or refraction effects of the reflective pattern, the reflective pattern may have bright color, for example, color close to white.

Also, the reflective pattern may consist of a plurality of dots made of the above described material.

For example, the reflective pattern may consist of circular, oval or polygonal dots.

In addition, the density of the reflective pattern may increase from one light source to the other adjacent light source.

For example, the density of the reflective pattern may increase from a first light source to a second light source adjacent to each other.

With this configuration, it is possible to prevent deterioration in the luminance of light directed upward from a region distant from the first light source, i.e. a region near a rear surface (i.e. non-emission surface) of the second light source and consequently, to maintain uniform luminance of light provided from the backlight unit.

The light-shield sheet 280 may be closely formed on the transparent resin layer 290 and may have a predetermined light-shield pattern.

The light-shield sheet 280 may serve to reduce luminance of light emitted from a region adjacent to the light source 100, ensuring emission of uniform luminance of light from the backlight unit.

A light-shield pattern may be formed on the light-shield sheet 280 in consideration of irregular luminance of light reflected from the reflective surface 210 of the reflector 200.

Here, the light-shield sheet 280 may take the form of a single layer, respective regions of which have different light transmittances, or a plurality of layers.

In addition, the thickness of the light-shield pattern of the light-shield sheet 280 may be kept constant or may gradually decrease with increasing distance from the light emission surface of the light source 100.

Also, the width of the light-shield pattern of the light-shield sheet 280 may be kept constant or may gradually decrease with increasing distance from the light emission surface of the light source 100.

The light-shield sheet 280 may be made of at least one selected from the group consisting of a metal, $TiO_2$, $CaCO_3$ and $ZnO$.

As occasion demands, the light-shield sheet 280 may be spaced apart from the transparent resin layer 290 with a predetermined space filled with air or gas therebetween, or a predetermined buffer layer may further be formed between the light-shield sheet 280 and the transparent resin layer 290.

The buffer layer may be a diffusion layer, may be made of a material having a different refractive index than the transparent resin layer 290, may be an adhesive layer to improve adhesion between the light-shield sheet 280 and the transparent resin layer 290, or may be a heat absorption layer formed during fabrication of the light-shield pattern of the light-shield sheet 280.

The transparent resin layer 290 may serve to diffuse the light emitted from the light source 100 while also uniformly transmitting the light emitted from the light source 100 to the display panel.

The transparent resin layer 290 may be made of a light transmitting material, for example, silicon or acryl-based resin.

However, the constituent material of the transparent resin layer 290 is not limited to the aforementioned materials and may be selected from among various resins.

To ensure that the light emitted from the light source 100 is diffused to realize uniform luminance of the backlight unit, the transparent resin layer 290 may be made of a resin having a refractive index of about 1.4 to 1.6.

For example, the transparent resin layer 290 comprising at least one selected from the group consisting of polyethylene terephthalate (PET), polycarbonate (PC), polypropylene (PP), polyethylene (PE), polystyrene (PS), poly epoxy (PE), silicon (Si), acryl, and the like.

The transparent resin layer 290 may contain an adhesive polymer resin so as to be firmly attached to the light source 100 and the reflector 200.

For example, the transparent resin layer 290 comprising at least one selected from the group consisting of unsaturated polyester, methyl methacrylate, ethyl methacrylate, isobutyl methacrylate, N-butyl methacrylate, acrylic acid, methacrylic acid, hydroxyl ethyl methacrylate, hydroxyl propyl methacrylate, hydroxyl ethyl acrylate, acrylamide, ethyl acrylate, isobutyl acrylate, N-butyl acrylate, and the like.

The transparent resin layer 290 may be formed by applying liquid-phase or gel-phase resin to the light source and the reflector 200 and curing the applied resin.

The transparent resin layer 290 may serve as a light guide plate to guide the light emitted from the light source 100.

Differently from the backlight unit of FIG. 24, the backlight unit of FIG. 25 includes a predetermined space filled with air or gas between the reflector 200 and the light-shield sheet 280, instead of the transparent resin layer 290.

Here, the light-shield sheet 280 may be formed and supported on a partial upper region of the reflector 200.

As compared to the embodiment of FIG. 24, the embodiment of FIG. 25 provides a more simplified process, reduced thickness of the backlight unit and low process costs.

Next, differently from the backlight unit of FIG. 25, the backlight unit of FIG. 26 further includes a light guide plate 270 formed on the reflective surface 210 of the reflector 200.

The reason why the light guide plate 270 is formed on the reflective surface 210 of the reflector 200 is to reflect and simultaneously, diffuse the light emitted from the light source 100, allowing the light emitted from the light source 100 to be uniformly transmitted to a display panel.

Figure 27:
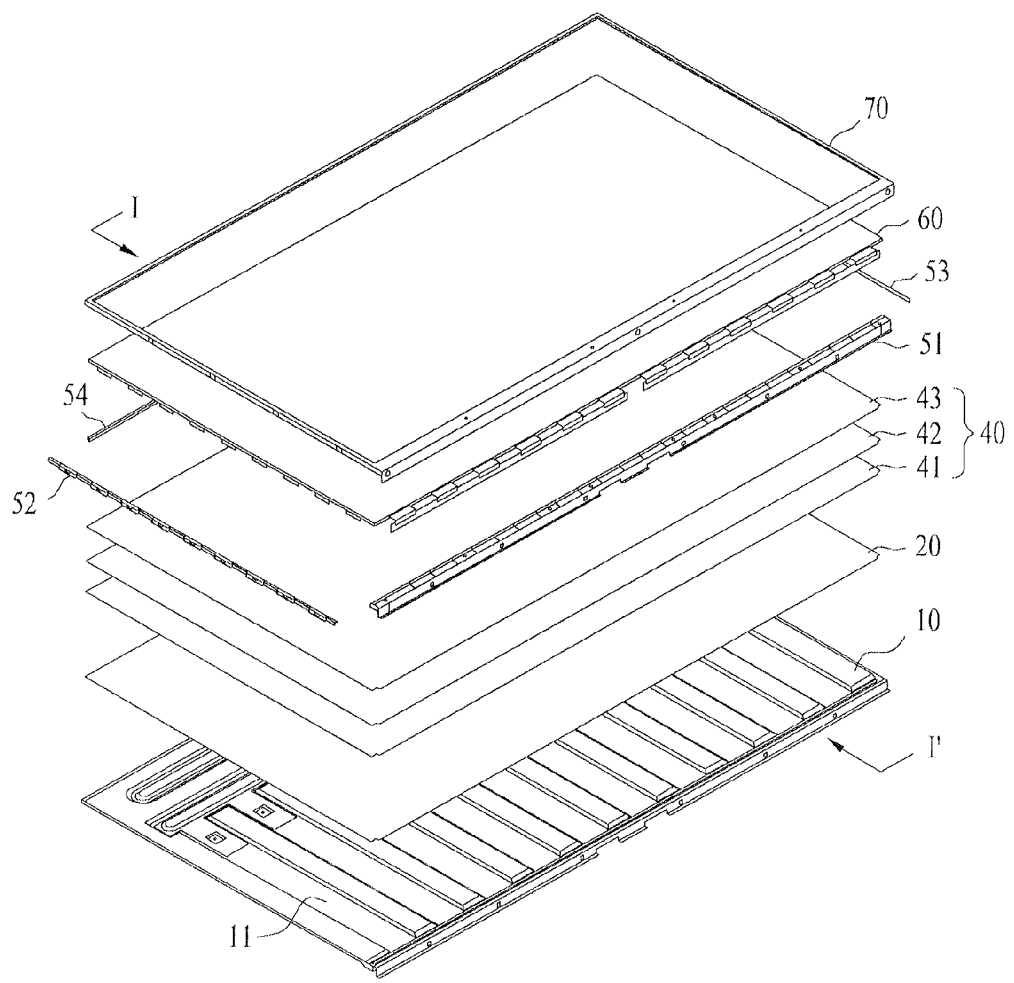
FIG. 27 is an exploded perspective view of a display apparatus according to an embodiment.

FIG. 27 is an exploded perspective view of a display apparatus according to an embodiment.

As illustrated in FIG. 27, the display apparatus according to the embodiment includes a bottom cover 10, a light source module (not shown) provided at an inner position of the bottom cover 10, a reflective sheet 20 disposed on a front of the bottom cover 10, an optical sheet 40 disposed in front of the reflective sheet 20 to guide light emitted from the light source module forward of the display apparatus, a liquid crystal display panel 60 disposed in front of the optical sheet 40, a top cover 70 disposed in front of the liquid crystal display panel 60, and support members 51, 52, 53 and 54 disposed between the bottom cover 10 and the top cover 70 so as to fix the bottom cover 10 and the top cover 70 to each other.

The reflective sheet 20 serves to reflect light emitted from the light source module such that the light is emitted as planar light, which increases light efficiency.

Here, the reflective sheet 20 may be made of a material which has high reflectivity and is usable in a super thin form. For example, the reflective sheet 20 may be made of polyethylene terephthalte (PET). Also, the reflective sheet 20 may be formed by coating the front surface of the bottom cover 10 with a high reflectivity material.

The optical sheet 40 disposed at a front surface of the reflective sheet 20 may serve to diffuse and refract the light reflected from the reflective sheet 20, which increases luminance and light efficiency.

The optical sheet 40 may include a plurality of sheets or a single sheet.

Specifically, the optical sheet 40 may include a first diffusion sheet 41, a prism sheet 42, and a second diffusion sheet 43, or may include a single optical sheet having both functions of a diffusion sheet and a prism sheet.

The number and kind of constituent sheets of the optical sheet 40 may be variously selected according to required luminance characteristics.

Figure 28:
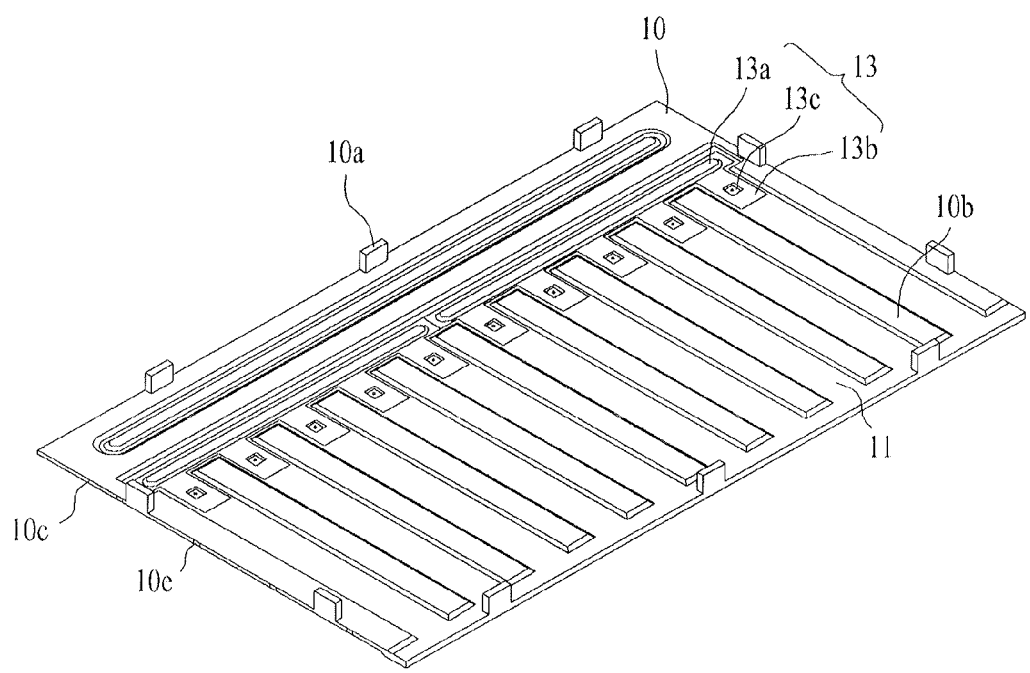
FIG. 28 is a front perspective view illustrating a bottom cover of the backlight unit and the display apparatus.

FIG. 28 is a front perspective view illustrating the bottom cover of the backlight unit and the display apparatus.

The bottom cover 10 may take the form of a metal plate. To increase strength of the bottom cover 10, the bottom cover 10 may include a forwardly protruding first forming portion (not shown) which extends in a left-and-right direction, and a forwardly protruding second forming portion 10b extending in a direction perpendicular to the left-and-right direction in which the first forming portion extends.

The first forming portion and the second forming portion 10b may be formed by pressing the bottom cover 10.

The first forming portion and the second forming portion 10b have flat front surfaces respectively, and the flat surfaces have the same height.

This serves to allow the reflective sheet (20, see FIG. 1) to be disposed on the first forming portion and the second forming portion 10b.

To increase the strength of the bottom cover 10, a plurality of second forming portions 10b may be spaced apart from one another.

A first heat sink member 11 in the form of a heat pipe may be installed between the neighboring second forming portions 10b. Thus, a plurality of first heat sink members 11 may be spaced apart from one another.

The first heat sink members 11 serve to dissipate heat generated during light emission of the light source module (not shown) disposed on the bottom cover 10 to the outside.

To this end, the first heat sink members 11 may be installed on the bottom cover 10 by a predetermined length so as to be parallel to the second forming portion 10b.

Since the second forming portion 10b forwardly protrudes by a predetermined height, a portion of the second forming portion 10b adjacent to the first heat sink member 11 may be inclined to ensure easy installation of the first heat sink member 11.

The rim of the bottom cover 10 is forwardly bent to form a rim wall 10c, which serves to prevent separation of the light guide plate, optical sheet or reflective sheet mounted on the bottom cover 10.

The bottom cover 10 is provided with coupling holes 10g to allow the support members 51, 52, 53 and 54 and the top cover 70 to be coupled to the bottom cover 10 via fastening members, such as screws.

Left and right rim walls of the bottom cover 10 are provided with coupling bosses 10e such that the top cover 70 is caught by the coupling bosses 10e. Also, to increase rigidity of the bottom cover 10, an H-beam may be installed to a rear surface of the bottom cover 10.

A mounting member 13 may be provided on the bottom cover 10 to fix the first heat sink member 11 to the bottom cover 10.

The mounting member 13 includes a body 13a disposed in the left-and-right direction, an extension 13b extending perpendicular from the body 13a toward the first heat sink member 11, and a fastening hole 13c perforated in the extension 13b, through which a fastening member penetrates to couple the first heat sink member 11 and the bottom cover 10 to each other.

Thus, after the first heat sink member 11 is placed on the front surface of the bottom cover 10 and subsequently, the extension 13b of the mounting member 13 is placed on the front surface of the heat sink member 11, the fastening member is inserted into the fastening hole 13c of the extension 13b such that the first heat sink member 11 between the bottom cover 10 and the extension 13b comes into close contact with both the bottom cover 10 and the extension 13b by fastening force of the fastening member.

Figure 29:
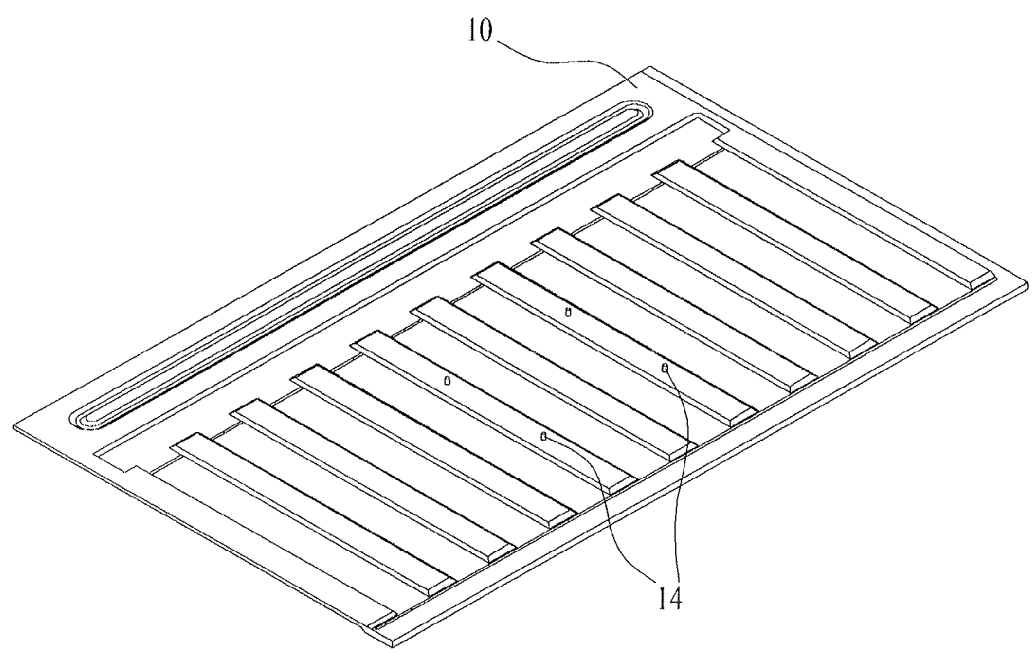
FIG. 29 is a rear perspective view illustrating the bottom cover of the backlight unit and display apparatus.

FIG. 29 is a rear perspective view illustrating the bottom cover of the backlight unit and the display apparatus.

As illustrated in FIG. 29, a plurality of fixing pins 14 is provided at the rear surface of the bottom cover 10. The fixing pins 14 serve to fix a power device or a printed circuit board to the rear surface of the bottom cover 10.

The fixing pins 14 are fitted into the power device or the printed circuit board, functioning to increase rigidity of the bottom cover 10.

Figure 30:
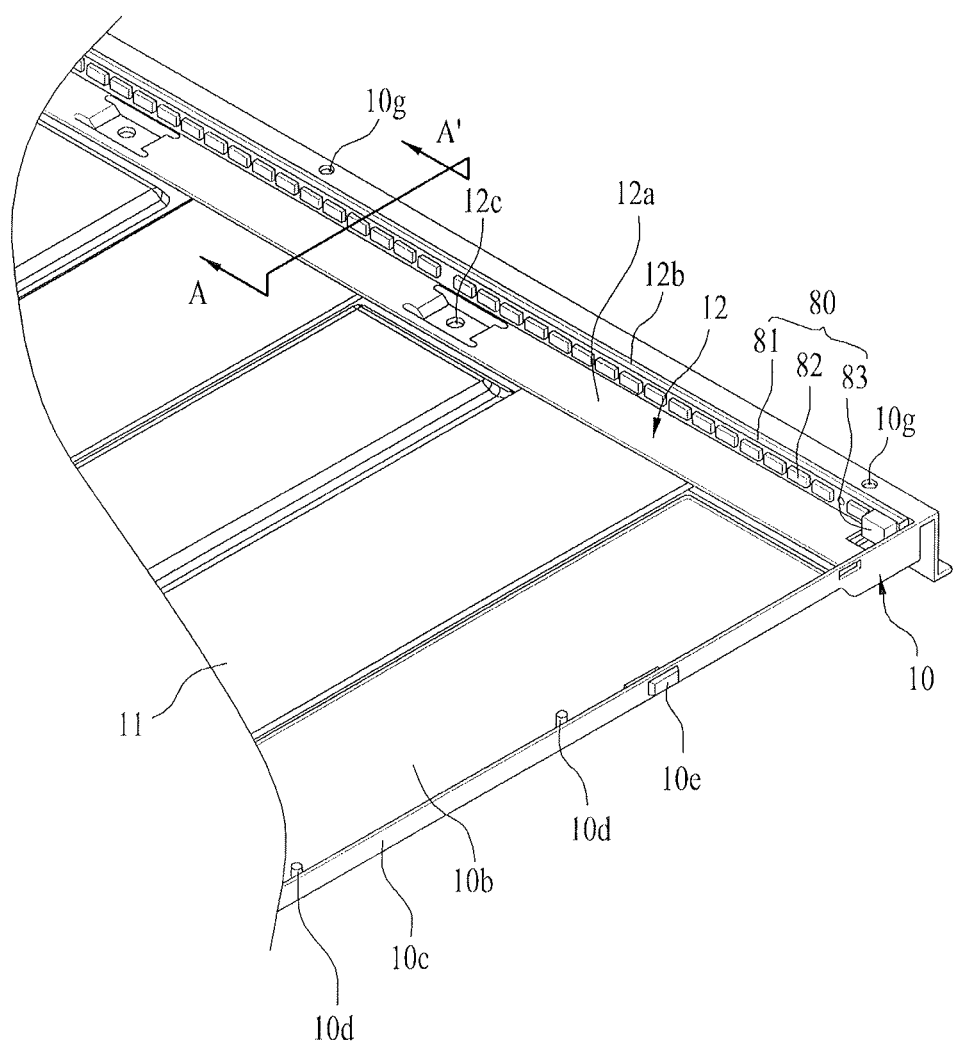
FIG. 30 is a view illustrating a light source module provided at an inner position of the bottom cover of the backlight unit and the display apparatus.

FIG. 30 is a view illustrating the light source module provided at an inner position of the bottom cover of the backlight unit and the display apparatus.

The light source module 80 is an LED package, but is not limited thereto and may be formed of a Cold Cathode Fluorescent Lamp (CCFL) or Organic Light Emitting Diodes (OLEDs).

The light source module 80 may be of a "1-edge" type in which light emitting devices 82 thereof are disposed at an upper or lower edge of the bottom cover 10 and the display panel 60, or a "2-edge" type in which light emitting devices 82 thereof are disposed at two opposite sides of the bottom cover 10.

To achieve desired luminance and uniform light distribution, the number of the light emitting devices 82 may be changed according to the size of the display panel 60, i.e. a diagonal length (inch value) of the display panel 60. The number of the light emitting devices 82 may be 2.5-3.5 times the inch value of the display panel 60. If the number of the light emitting devices 82 is less than 2.5 times the inch value of the display panel 60 or is greater than 3.5 times the inch value of the display panel 60, it is difficult to provide light having appropriate luminance and uniform distribution.

For example, if the display panel 60 has a diagonal length of 47 inches, 118 to 164 light emitting devices 82 may be installed. In the present embodiment, it is assumed that the display panel 60 has a diagonal length of 47 inches and the number of the light emitting devices 82 is 138.

Of the plurality of second forming portions 10b disposed on the bottom cover 10, leftmost and rightmost second forming portions 10b are provided with support pieces 10d spaced apart from one another in a straight direction.

Figure 31A:
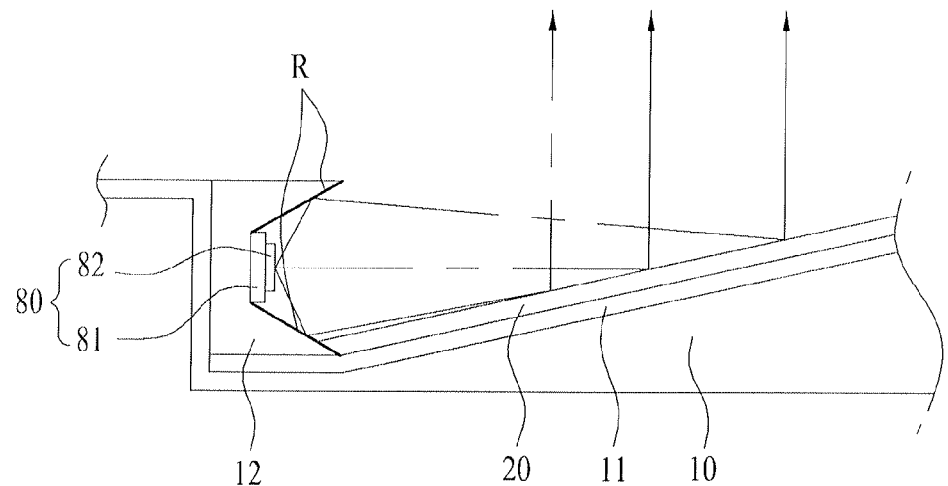
FIGS. 31A to 31C are views illustrating configurations and operations of a light source module and a reflective sheet.
Figure 31B:
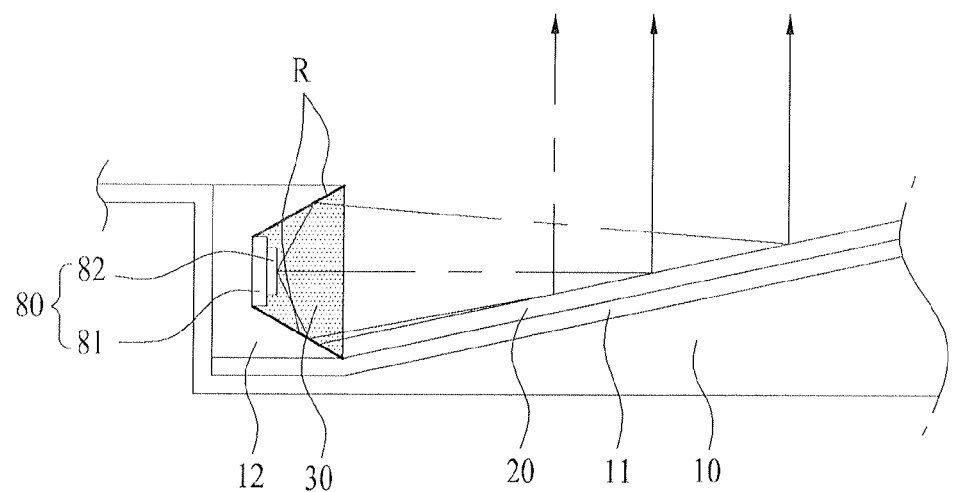
Figure 31C:
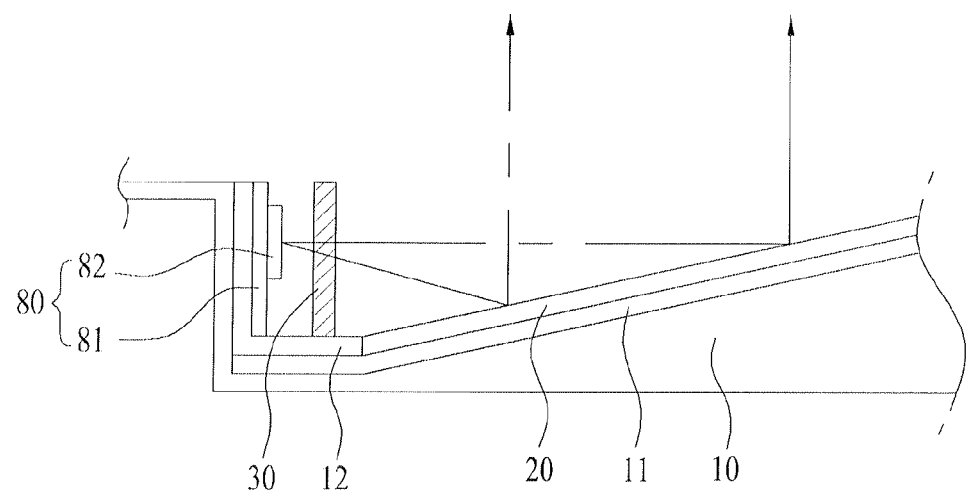

FIGS. 31A to 31C are views illustrating configurations and operations of a light source module and the reflective sheet. FIG. 31A is a sectional view taken along the line A-A' of FIG. 30 illustrating a part of the "1-edge" type backlight unit.

In the embodiment illustrated in FIG. 31A, the light source module 80 is provided on one edge of the bottom cover 10. The light source module 80 may include a circuit board 81, an array of light sources such as light emitting devices 82 disposed on the circuit board 81 at a predetermined interval, and a connector (not shown) provided on the circuit board 81 to connect the circuit board 81 to an external power device.

The light source module 80 is installed on a bracket 12, and the reflective sheet 20 is provided at a side surface of the bracket 12. The first heat sink member 11 provided on the bottom cover 10 is connected to the bracket 12 so as to directly dissipate heat generated from the light source module 80 to the outside. Although FIG. 31A illustrates the reflective sheet 20 and the first heat sink member 11 as directly coming into contact with each other, in fact, the reflective sheet 20 and the first heat sink member 11 may be spaced apart from each other by a predetermined distance, which can prevent thermal deformation of the reflective sheet 20.

In this case, the height of the bottom cover 10 may increase with increasing distance from the light source module 80. That is, the thickness of the bottom cover 10 may have the smallest value at a first surface in contact with the light source module 80 and the greatest value at a second surface opposite to the first surface, thereby having a height deviation.

FIG. 31A illustrates an exaggerated height deviation of the bottom cover 10, and the height of the bottom cover 10 is sufficient if a peak point of the second surface reflects direct light emitted from the light source module 80. The first heat sink member 11 and the reflective sheet 20 may be inclined according to the gradient of the bottom cover 10.

The height of the bottom cover 10 gradually increases and a distance between the bottom cover 10 and the optical sheet (not shown) decreases with increasing distance from the light source module 80 although this is exaggerated in FIG. 31A. Since the reflective sheet 20 provided on the bottom cover 10 may also be inclined, the reflective sheet 20 becomes closer to the optical sheet as a distance from the light source module 80 increases. Also, the reflective sheet 20 supported on the bottom cover 10 may be parallel to the bottom cover 10.

The light emitting device 82 may project light parallel to the lower surface of the bottom cover 10. Specifically, the light emitting device 82 emits light in an opposite direction of the circuit board 81, i.e. in the right direction of FIG. 31A within a range of about 120 degrees in consideration of an orientation angle thereof.

The light projected from the light emitting device 82 in a direction parallel to the lower surface of the bottom cover 10 may be incident on the reflective sheet 20 to have a predetermined angle with the reflective sheet 20 to thereby be reflected toward the optical sheet (not shown). In this case, the reflective sheet 20 is inclined as described above with respect to the center of the emission angle of light projected from the light emitting device 82.

The configuration of the light source module 80 will now be described in detail.

The bracket 12 is fixed to one edge of the bottom cover 10 and has a recess into which the circuit board 81 and the array of the light emitting devices 82 are inserted such that the circuit board 81 comes into contact with a bottom surface of the recess. A reflective layer R is formed on an inclined surface of the recess so as to project light emitted from the array of the light emitting devices 82 toward the reflective sheet 20. The reflective layer R may be formed by coating a material having high reflectivity, such as Ag or Al.

In the above described embodiment, the light emitted from the light emitting device 82 is reflected from the reflective layer R or directly moves to the reflective sheet 20. Thereby, as the light is uniformly reflected from the entire area of the reflective sheet 20 having a predetermined gradient so as to move toward the optical sheet, planar light is introduced into the optical sheet 40, which enables omission of a light guide plate.

Thus, the backlight unit and the display apparatus can achieve reduced cost and weight thereof. Furthermore, omission of a resin-based light guide plate may eliminate problems due to the light guide plate, such as moisture vulnerability and thermal expansion by heat generated from the light source module. Also, omission of a rigid structure to fix the light guide plate to the bottom cover of the backlight unit is possible.

FIG. 31B is a view illustrating a configuration and operation of the light source module and the reflective sheet according to another embodiment.

Although the present embodiment is basically identical to the embodiment illustrated in FIG. 31A, in the present embodiment, a light diffusion layer 30 fills the recess of the bracket 12 to refract the light emitted from the array of the light emitting devices 82, allowing the light to be uniformly projected to the reflective sheet 20.

The light diffusion layer 30 serves to scatter the light emitted from the light emitting devices 82, allowing the light to be uniformly distributed throughout the inclined reflective sheet 20.

To this end, the light diffusion layer 30 may be made of a material having high refractivity and transmittance, such as a polymethylmethacrylate (PMMA), polycarbonate (PC), polyethylene (PE) or injection molding resin.

FIG. 31C is a view illustrating a configuration and operation of the light source module and the reflective sheet according to another embodiment.

Although the present embodiment is basically identical to the embodiments illustrated in FIGS. 31A and 31B, the bracket 12 of the present embodiment has an L-shaped from to support the circuit board 81 to which the light emitting devices 82 are fixed.

The light diffusion layer 30 is spaced apart from a front surface of the light emitting device 82 by a predetermined distance. To prevent the light diffusion layer 30 from being deformed by heat of the light emitting device 82, the light diffusion layer 30 may be spaced apart from the light emitting device 82 by a distance of 1 mm to 5 mm.

If the distance between the light diffusion layer 30 and the light emitting device 82 is greater than 5 mm, this results in inefficient space utilization at the edge of the bottom cover 10 or causes a part of the light emitted from the light emitting device 82 to be directed into an interior space of the backlight unit rather than passing through the light diffusion layer 30. Thus, the light diffusion layer 30 may be wider than the emission angle of light from the light emitting device 82.

The light guide plate may be omitted from the backlight unit according to the above described embodiments because the light projected from the light source module 80 is reflected from the reflective sheet 20 and thus, the resulting planar light is introduced into the optical sheet 40. As the light diffusion layer 30, which has a composition similar to a conventional light guide plate and functions similar to the light guide plate, is provided only at one edge of the bottom cover 10 differently from the conventional light guide plate provided throughout the front surface of the backlight unit, the backlight unit and the display apparatus can achieve reduced cost and weight. In addition, the backlight unit and the display apparatus are free from problems due to the light guide plate which is vulnerable to moisture and thermally expands by heat of the light source. In addition, a rigid structure to fix the light guide plate to the bottom cover is unnecessary.

When the light guide plate is omitted, the optical sheet 40 is spaced apart from the reflective sheet 20 by a predetermined distance. In this case, the reflective sheet 20 is fixed to the bottom cover 10, but the optical sheet 40 may be kept separately. Thus, the optical sheet 40 is separably fixed using fixing members 10*a* on the bottom cover 10. Specifically, the fixing members 10*a* are rectangular members vertically installed on respective edges of the bottom cover 10.

The optical sheet 40 is provided at each edge thereof with at least one hole 40*a*. As the fixing member 10a of the bottom cover 10 is inserted into the hole 40*a* of the optical sheet 40, the optical sheet 40 may be coupled to the bottom cover 10.

Thus, since the first diffusion sheet 41, the prism sheet 42 and the second diffusion sheet 43 are coupled to the bottom cover 10 at the same positions, tension may be concentrated on the same position of the respective sheets 41, 42 and 43. To solve this problem, the optical sheet has a coupling structure as will be described hereinafter.

Figure 32A:
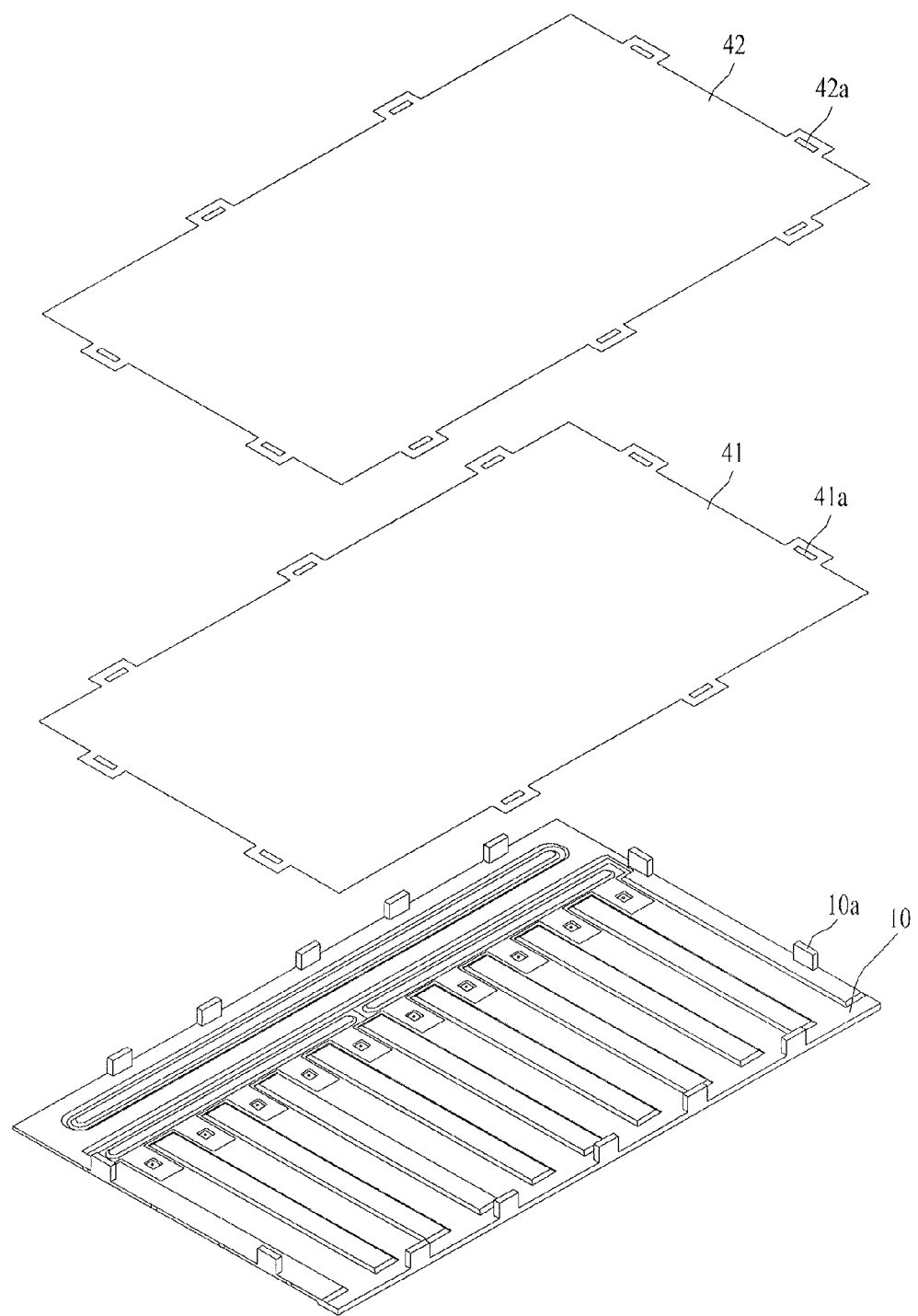
FIGS. 32A to 32C are views illustrating coupling between an optical sheet and a bottom cover of the backlight unit and the display apparatus according to one embodiment.
Figure 32B:
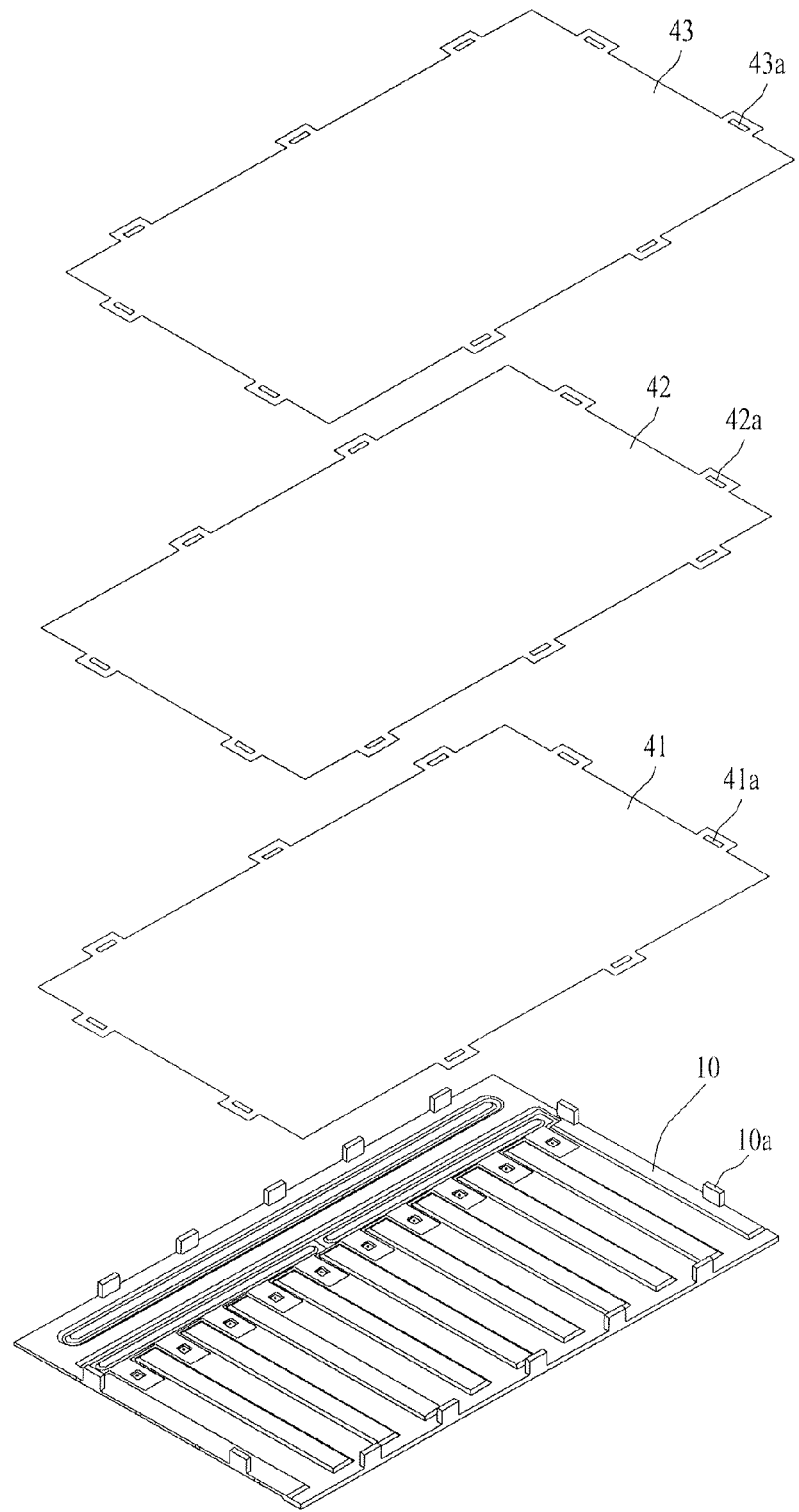
Figure 32C:
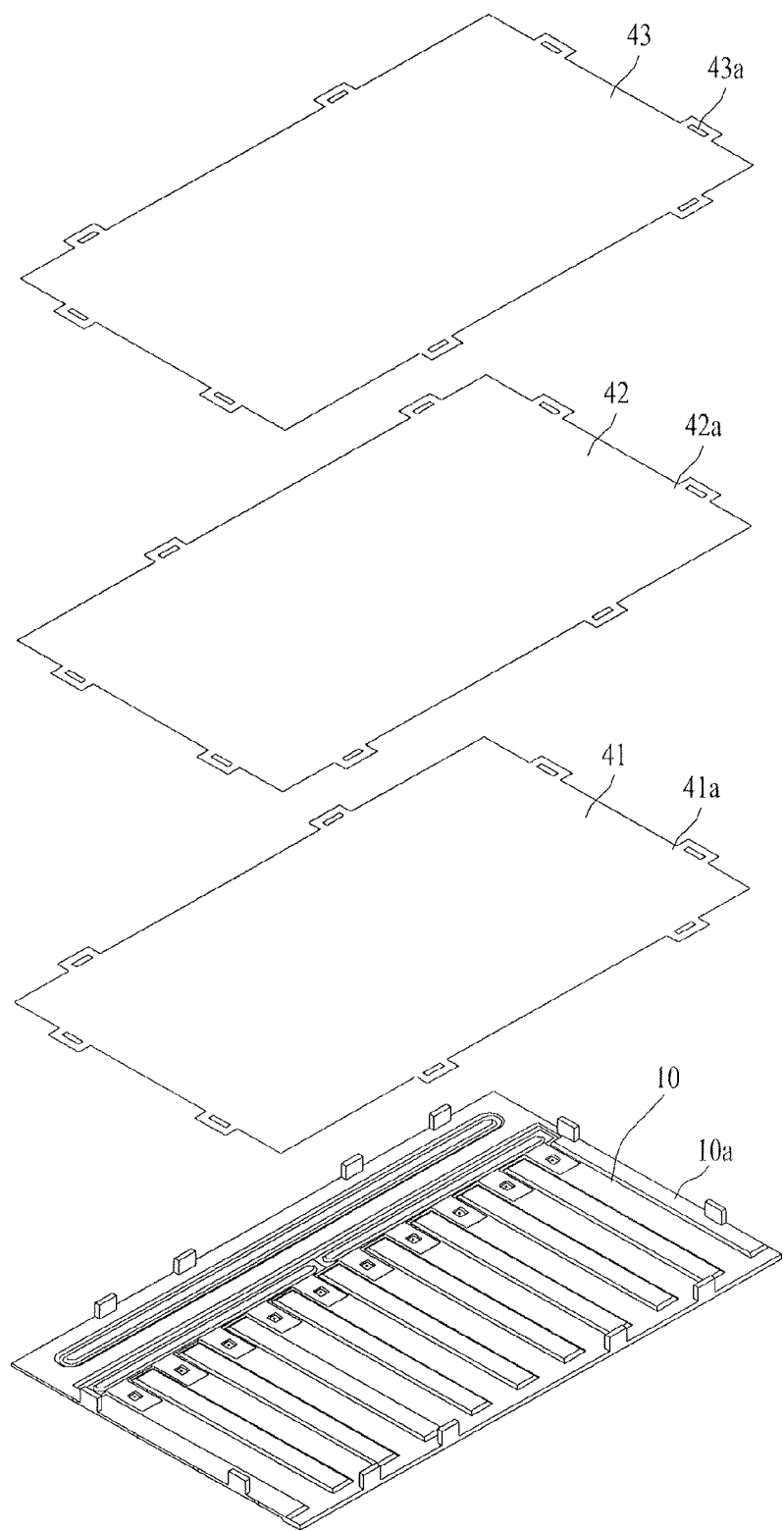

FIGS. 32A to 32C are views illustrating coupling between the optical sheet and the bottom cover of the backlight unit and the display apparatus according to one embodiment.

Although FIG. 32A illustrates coupling of the first diffusion sheet 41 and the prism sheet 42 and FIGS. 32B and 32C illustrate coupling of the first diffusion sheet 41, the prism sheet 42 and the second diffusion sheet 43, three or more sheets may be provided and additionally, a micro-lens array sheet and a protective sheet may be provided.

The number of the fixing members 10*a* provided on the bottom cover 10 may be greater than the number of the holes 41*a*, 42*a* and 43*a* formed in the edges of the respective sheets. Also, the holes 41*a*, 42*a* and 43*a* of the respective sheets may be larger than the fixing members 10*a* in consideration of thermal expansion of the sheets 41, 42 and 43.

In FIG. 32A, the first sheet 41 and the second sheet 42 are coupled to the bottom cover 10. The fixing members 10*a* provided on the edges of the bottom cover 10 may serve to couple the first optical sheet 41 and the second optical sheet 42 to the bottom cover 10.

In this case, the holes 41*a* of the first optical sheet 41 may be located at different positions from the holes 42*a* of the second optical sheet 42. That is, the holes 41a of the first optical sheet 41 and the holes 42*a* of the second optical sheet 42 are coupled to the fixing members 10*a* located at different positions.

Among the holes 41*a* of the first optical sheet 41 and the holes 42*a* of the second optical sheet 42, the holes of upper and lower edges are located at different positions and the holes of left and right edges are located at the same positions. Here, the terms "upper" and "lower" are based on a direction in which the backlight unit or the display apparatus having the same is installed when in use. The reason for positioning the upper and lower holes at different positions is that tension is mainly applied to the respective sheets 41 and 42 in a vertical direction, i.e. to the upper and lower edges.

In FIG. 32B, the first sheet 41, the second sheet 42 and the third sheet 43 are coupled to the bottom cover 10. The first optical sheet 41, the second optical sheet 42 and the third optical sheet 43 may be coupled to the bottom cover 10 by the fixing members 10*a* provided on the edges of the bottom cover 10.

In this case, the holes 41*a* of the first optical sheet 41 may be located at different positions from the holes 42*a* of the second optical sheet 42. That is, the holes 41a of the first optical sheet 41 and the holes 42*a* of the second optical sheet 42 are coupled to the fixing members 10*a* located at different positions. Also, the holes 42*a* of the second optical sheet 42 may be located at different positions from the holes 43*a* of the third optical sheet 43. That is, the holes 42*a* of the second optical sheet 42 and the holes 43*a* of the third optical sheet 43 are coupled to the fixing members 10*a* located at different positions.

The holes 41*a* of the first optical sheet 41 may be located at the same positions as the holes 43*a* of the third optical sheet 43. That is, the holes 41*a* of the first optical sheet 41 and the holes 43*a* of the third optical sheet 43 are coupled to the fixing members 10*a* located at the same positions.

In the embodiment illustrated in FIG. 32C, the first sheet 41, the second sheet 42 and the third sheet 43 are coupled to the bottom cover 10 similar to the embodiment illustrated in FIG. 32B. In the present embodiment, the holes 41*a* of the first optical sheet 41, the holes 42*a* of the second optical sheet 42 and the holes 43*a* of the third optical sheet are located at different positions and coupled to the fixing members 10*a* located at different positions.

Specifically, if it is impossible to cancel tension applied to the sheets when some overlapping sheets are coupled to one another at the same positions in the same manner as in the embodiment of FIG. 32B, coupling all the sheets to the bottom cover 10 at different positions may disperse the tension. Here, although the sheets have the same left and right coupling positions because tension applied in the left-and-right direction of the sheets is not great, the left and right holes of the sheets may be located at different positions if it is unnecessary to reduce tension applied in the left-and-right direction.

With the above described coupling configuration according to the embodiment illustrated in FIGS. 32A to 32C, the number of the holes of the respective sheets may be greater than the number of the fixing members 10*a* of the bottom cover 10.

Figure 33:
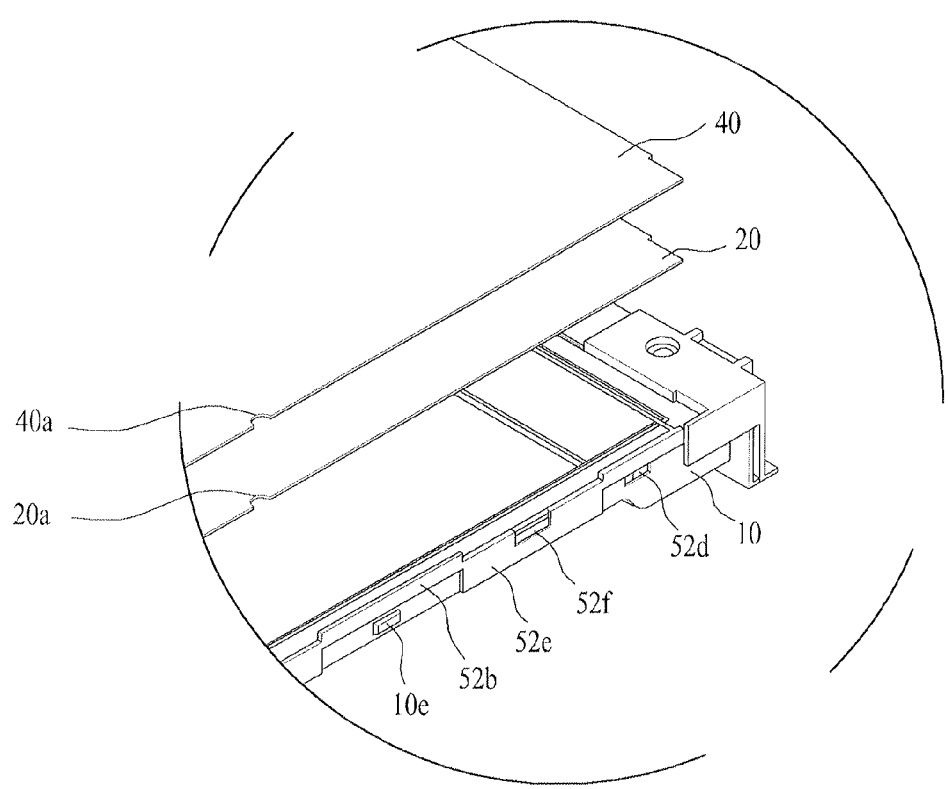
FIG. 33 is a view illustrating coupling between a reflective sheet, an optical sheet and a bottom cover of the backlight unit and the display apparatus according to another embodiment.

FIG. 33 is a view illustrating coupling between the reflective sheet, the optical sheet and the bottom cover of the backlight unit and the display apparatus according to another embodiment.

In particular, FIG. 33 illustrates a coupling structure at the left or right side of the reflective sheet 20 and the optical sheet 40. The reflective sheet 20 and the optical sheet 40 are disposed between the bottom cover 10 and the second and third support members 52 and 53 provided at the left and right sides of the bottom cover 10. The left and right rims of the reflective sheet 20 and the optical sheet 40 may be provided with recesses 20*a* and 40*a* for coupling with the support members 52 and 53.

As described above, tension applied to the left and right sides of the optical sheet 40 is not great and thus, the simplified coupling structure as illustrated may be provided at the left and right sides of the optical sheet 40.

As is apparent from the above description, one or more embodiments employ a reflector having a reflective surface inclined by a predetermined angle with respect to a horizontal plane, the reflector serving to uniformly reflect light emitted from a light source upward, realizing uniform luminance without an additional mechanical device.

Thus, the backlight unit has low manufacturing costs and reduced overall weight and provides uniform luminance, achieving enhanced economic efficiency and reliability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
an optical sheet;
a reflector having a reflective surface spaced apart from the optical sheet and partially having an inclined surface;
a fixture connected to one side of the reflector; and
a light source disposed to one side of the reflector,
wherein at least two reflective layers having different reflectivities are formed on at least a portion of the reflective surface.

2. The backlight unit according to claim 1, wherein an air guide is defined in a space between the optical sheet and the reflector.

3. The backlight unit according to claim 1, wherein the reflective layers are formed on the entire reflective surface.

4. The backlight unit according to claim 1, wherein a lower surface of the reflector and an upper surface of the fixture are arranged to face each other, and a distance between the lower surface of the reflector and the upper surface of the fixture increases with increasing distance from a connection location of the reflector and the fixture.

5. The backlight unit according to claim 4, wherein at least one of an elastic member and a spacer is disposed between the lower surface of the reflector and the upper surface of the fixture.

6. The backlight unit according to claim 1, wherein a thickness of the reflector increases with increasing distance from the light source.

7. The backlight unit according to claim 1, further comprising a plate to support the reflector.

8. The backlight unit according to claim 1, wherein a predetermined reflective pattern is formed on the reflective layer.

9. The backlight unit according to claim 8, wherein a size of the reflective pattern increases with increasing distance from the light source.

10. The backlight unit according to claim 1, wherein the inclined surface of the reflector has an inclination angle of 0 to 85 degrees with respect to an optical axis of light transmitted from the light source.

11. The backlight unit according to claim 1, wherein the inclined surface of the reflector includes saw teeth each having a first face and a second face, and an angle between the first face and the second face is an acute angle or an obtuse angle.

12. The backlight unit according to claim 1, wherein the inclined surface of the reflector is a flat surface or a curved surface.

13. The backlight unit according to claim 1, wherein the light source is disposed to come into contact with at least one side of the reflector, or is spaced apart from the reflector by a predetermined distance.

14. The backlight unit according to claim 1, further comprising a minor to reflect the light transmitted from the light source toward the inclined surface of the reflector.

15. A backlight unit comprising:
an optical sheet;
a reflector having a reflective surface spaced apart from the optical sheet and partially having an inclined surface;
a bracket disposed between the optical sheet and the reflector and having a recess formed therein; and
a light source disposed in the recess of the bracket,
wherein at least two reflective layers having different reflectivities are formed on at least a portion of the reflective surface.

16. The backlight unit according to claim 15, wherein the recess of the bracket is oriented toward the reflector.

17. The backlight unit according to claim 15, wherein another reflective layer is provided at a surface of the recess of the bracket.

18. The backlight unit according to claim 15, wherein a light diffusion layer fills the recess of the bracket.

19. A backlight unit comprising:
an optical sheet;
a reflector having a reflective surface spaced apart from the optical sheet and partially having an inclined surface;
a bracket disposed between the optical sheet and the reflector;
a light source fixed to the bracket; and
a light diffusion layer spaced apart from a front surface of the light source by a predetermined distance,
wherein at least two reflective layers having different reflectivities are formed on at least a portion of the reflective surface.

* * * * *